United States Patent
Bhogal et al.

(10) Patent No.: US 11,022,321 B1
(45) Date of Patent: Jun. 1, 2021

(54) COOKING APPLIANCE ACCESSORY AND METHOD OF USE

(71) Applicant: June Life, Inc., San Francisco, CA (US)

(72) Inventors: Nikhil Bhogal, San Francisco, CA (US); Nicholas Beyrer, San Francisco, CA (US); Mathias Schmidt, San Francisco, CA (US)

(73) Assignee: June Life, Inc., San Francisco, CA (US)

( * ) Notice: Subject to any disclaimer, the term of this patent is extended or adjusted under 35 U.S.C. 154(b) by 0 days.

(21) Appl. No.: 17/124,264

(22) Filed: Dec. 16, 2020

Related U.S. Application Data

(60) Provisional application No. 62/948,594, filed on Dec. 16, 2019, provisional application No. 62/976,538, filed on Feb. 14, 2020.

(51) Int. Cl.
| | | |
|---|---|---|
| *F24C 7/08* | (2006.01) | |
| *G05D 23/19* | (2006.01) | |
| *G01K 1/14* | (2021.01) | |
| *A47J 27/10* | (2006.01) | |
| *A47J 27/04* | (2006.01) | |
| *A47J 36/06* | (2006.01) | |
| *A47J 37/06* | (2006.01) | |
| *A47J 36/32* | (2006.01) | |

(52) U.S. Cl.
CPC .............. *F24C 7/085* (2013.01); *A47J 27/04* (2013.01); *A47J 27/10* (2013.01); *A47J 36/06* (2013.01); *A47J 36/32* (2013.01); *A47J 37/0629* (2013.01); *A47J 37/0664* (2013.01); *G01K 1/14* (2013.01); *G05D 23/1917* (2013.01); *A47J 2027/043* (2013.01); *A47J 2202/00* (2013.01); *G01K 2207/06* (2013.01)

(58) Field of Classification Search
CPC ................ A47J 37/0664; A47J 37/0786; A47J 37/1271; A47J 37/1266; A47J 41/0094; A47J 2202/00; A47J 31/5253; A47J 31/56; G01K 1/14; G01K 1/143; G01K 1/146; F24C 7/08–088
See application file for complete search history.

(56) References Cited

U.S. PATENT DOCUMENTS

| | | | |
|---|---|---|---|
| 3,681,568 A | | 8/1972 | Schaefer |
| 3,751,305 A | * | 8/1973 | Huebscher ............... G01K 1/14 136/221 |
| 3,786,220 A | * | 1/1974 | Hamden, Jr. .......... G05D 23/24 219/622 |

(Continued)

FOREIGN PATENT DOCUMENTS

| | | | |
|---|---|---|---|
| FR | 2942162 A1 * | 8/2010 | ............... G01K 1/14 |
| GB | 1334550 A * | 10/1973 | ............... G01K 1/14 |

(Continued)

*Primary Examiner* — John J Norton
(74) *Attorney, Agent, or Firm* — Jeffrey Schox; Diana Lin

(57) ABSTRACT

The system is preferably used with a cooking appliance with a heating cavity and can include: a vessel and a temperature probe. The system can optionally include: a lid, a tray, and/or a circulator. However, the system can include any other suitable components. The system functions to monitor and/or control the temperature of a volume of working fluid in a cooking appliance with a heated cavity.

6 Claims, 18 Drawing Sheets

(56) References Cited

U.S. PATENT DOCUMENTS

| | | | | |
|---|---|---|---|---|
| 4,355,912 | A * | 10/1982 | Haak | G01K 1/14 374/208 |
| 4,399,351 | A * | 8/1983 | Koff | A47J 27/004 219/430 |
| 4,453,835 | A * | 6/1984 | Clawson | G01K 7/22 374/185 |
| 4,598,581 | A * | 7/1986 | Brekke | G01L 19/0007 374/145 |
| 4,817,510 | A | 4/1989 | Kowalics et al. | |
| 4,876,953 | A * | 10/1989 | Imamura | A47J 31/5253 99/280 |
| 8,390,420 | B2 * | 3/2013 | Zuchek | G01K 1/14 338/22 R |
| 8,637,797 | B2 | 1/2014 | Imura | |
| 9,341,522 | B2 | 5/2016 | Kitzman et al. | |
| 10,085,584 | B2 | 10/2018 | Johncock et al. | |
| 10,455,982 | B2 | 10/2019 | Magnouloux et al. | |
| 2007/0053407 | A1 | 3/2007 | Kinsler | |
| 2011/0003048 | A1 | 1/2011 | Sugimoto et al. | |
| 2014/0348987 | A1 | 11/2014 | Cheng et al. | |
| 2015/0185093 | A1 * | 7/2015 | Kitzman | G01K 1/08 73/862.381 |
| 2015/0208858 | A1 | 7/2015 | Robbins et al. | |
| 2016/0014849 | A1 * | 1/2016 | Hegedis | H05B 6/1272 219/627 |
| 2016/0367073 | A1 | 12/2016 | Smith | |
| 2017/0138798 | A1 | 5/2017 | Brown et al. | |
| 2017/0142780 | A1 | 5/2017 | Hoare et al. | |
| 2018/0310747 | A1 | 11/2018 | Wang et al. | |
| 2019/0017880 | A1 | 1/2019 | Smith | |
| 2019/0110628 | A1 * | 4/2019 | Lee | A47J 27/002 |
| 2019/0254471 | A1 * | 8/2019 | Reinhard-Herrscher | A47J 36/321 |
| 2019/0343339 | A1 * | 11/2019 | Ikuta | A23L 23/00 |

FOREIGN PATENT DOCUMENTS

| | | | | |
|---|---|---|---|---|
| GB | 2400660 A | * | 10/2004 | G01K 1/146 |
| JP | 07313341 A | * | 12/1995 | |
| JP | 2010099417 A | * | 5/2010 | |
| JP | 2019519779 A | | 7/2019 | |
| KR | 101436279 B1 | | 8/2014 | |
| WO | 2016077360 A1 | | 5/2016 | |

* cited by examiner

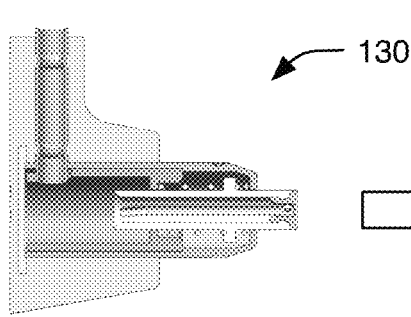
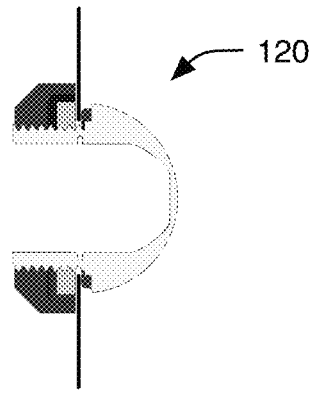
FIGURE 3A    FIGURE 3B
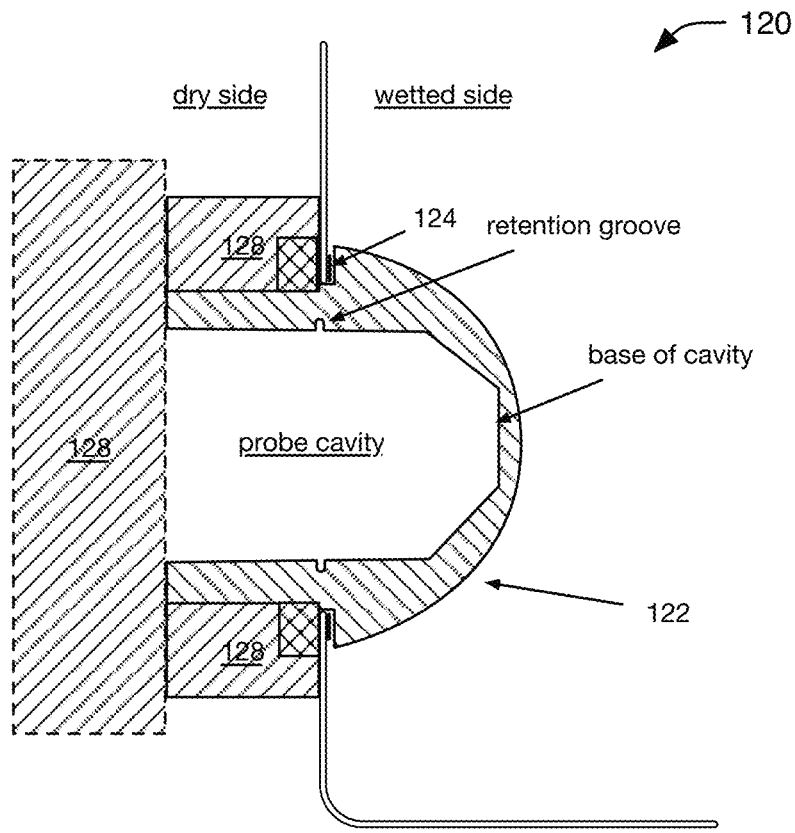
FIGURE 3C

COOKING APPLIANCE ACCESSORY AND METHOD OF USE

CROSS REFERENCE TO RELATED APPLICATIONS

This application claims the benefit of U.S. Provisional Application No. 62/976,538, filed 14 Feb. 2020, which is incorporated herein in its entirety by this reference. This application claims the benefit of U.S. Provisional Application No. 62/948,594, filed 16 Dec. 2019, which is incorporated herein in its entirety by this reference.

TECHNICAL FIELD

This invention relates generally to the cooking appliances field, and more specifically to a new and useful cooking appliance accessory in the cooking appliance field.

BRIEF DESCRIPTION OF THE FIGURES

FIGS. 3A-C are cross sectional views of a variation of the temperature probe, a first variation of the probe interface, and a second variation of the probe interface, respectively.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. Overview

Figure 1:
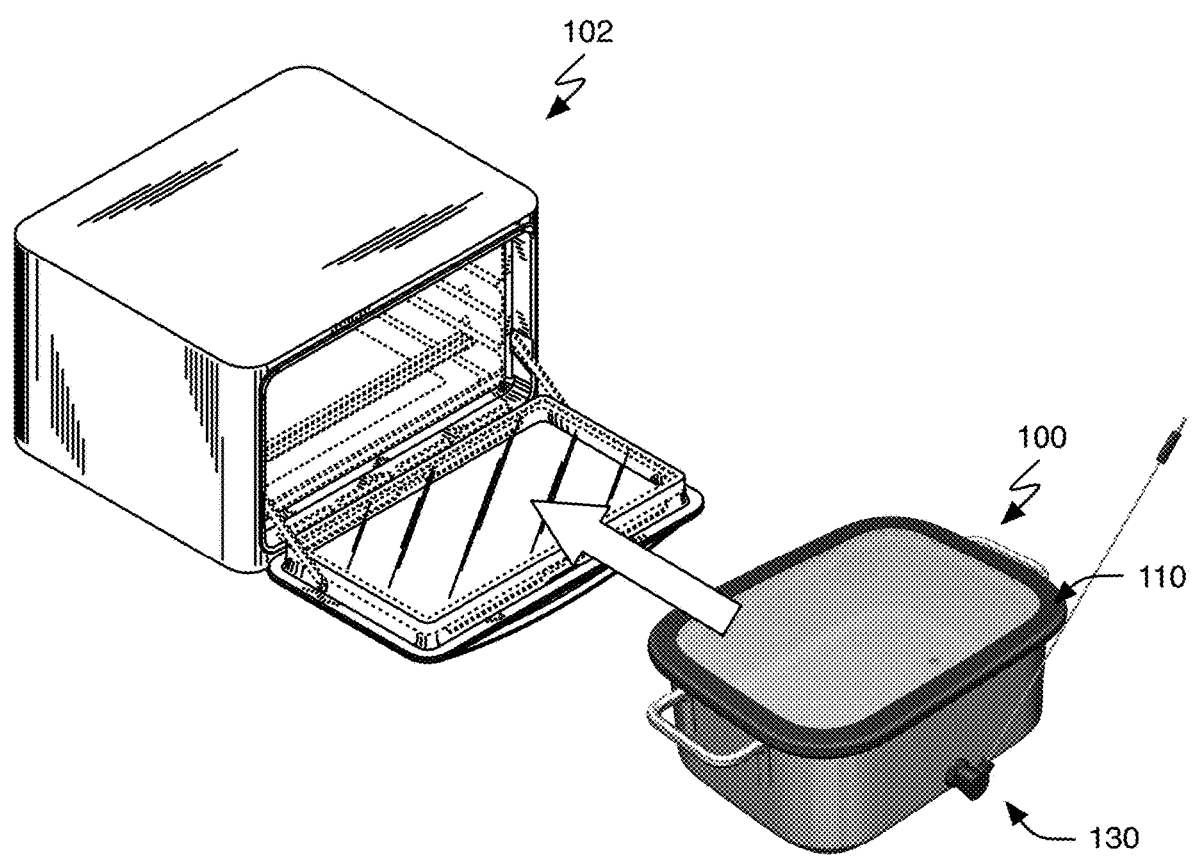
FIG. 1 is a schematic representation of a variation of the cooking appliance accessory.

The cooking appliance accessory 100 is preferably used with a cooking appliance 102 (an example is shown in FIG. 1) with a heating cavity (e.g., a connected oven) and can include: a vessel no and a temperature probe 130. The system can optionally include: a lid 170, a tray 180, and/or a circulator 190.

Figure 12:
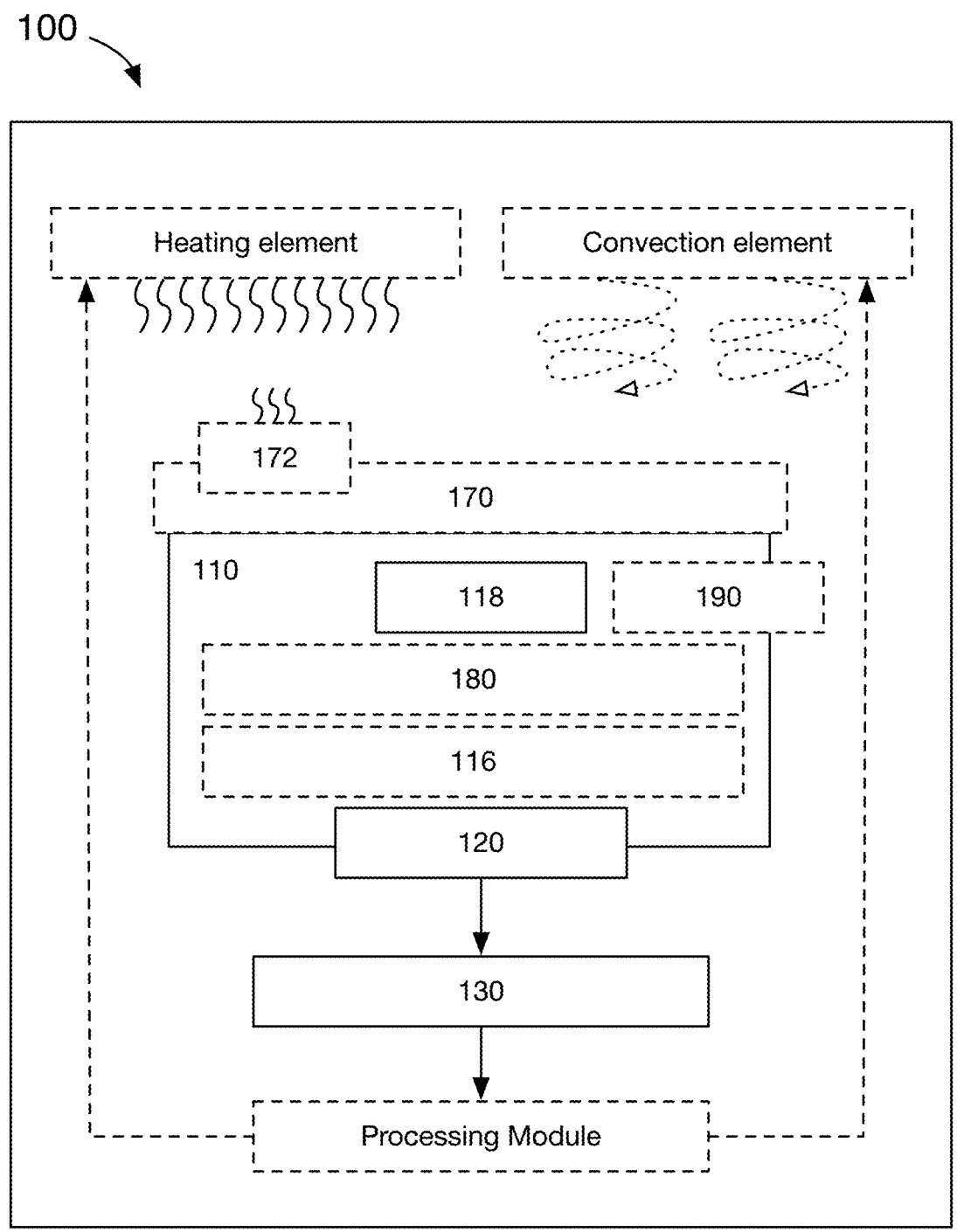
FIG. 12 is a schematic representation of the system.

Variants of the cooking appliance accessory 100 (an example is shown in FIG. 12) can enable wet cooking in various appliances. Wet cooking methods can include: sous vide cooking, steaming, rice cooking, boiling (e.g., parboiling, blanching, braising, coddling, double steaming, infusion, poaching, pressure cooking, simmering, smothering, steeping, stewing, vacuum flask cooking, etc.), frying, smoking (e.g., in a partitioned of the oven), absorption-based cooking, and/or other suitable cooking methods. Wet cooking can utilize any suitable working fluid/liquid media such as: water, broths, oils, fats, marinades, and/or any other suitable liquid.

2. Benefits

The cooking appliance accessory 100 can confer several benefits over conventional systems. First, variants of the cooking appliance accessory 100 can enable wet cooking in an oven. In some variants, wet cooking processes can be achieved without forced convection in an oven, leveraging the appliance's insulated heating cavity to create a uniform temperature distribution and minimize heat loss. Further, variants of the cooking appliance accessory can enable appliance control based on the working fluid temperature instead of the air temperature (e.g., using closed loop control; by controlling the convection elements, heating elements, etc.). Because the air temperature can differ from the working fluid temperature, this can avoid temperature overshoot that generates undesirable coloration lines or gradients in the food. Further, the heated air "blanket" around the vessel/working fluid inside the oven can result in better temperature uniformity in the working fluid than would be achieved by directly heating the working fluid (e.g., by a submerged heating element), reducing or eliminating the need to circulate the working fluid.

Figure 13A:
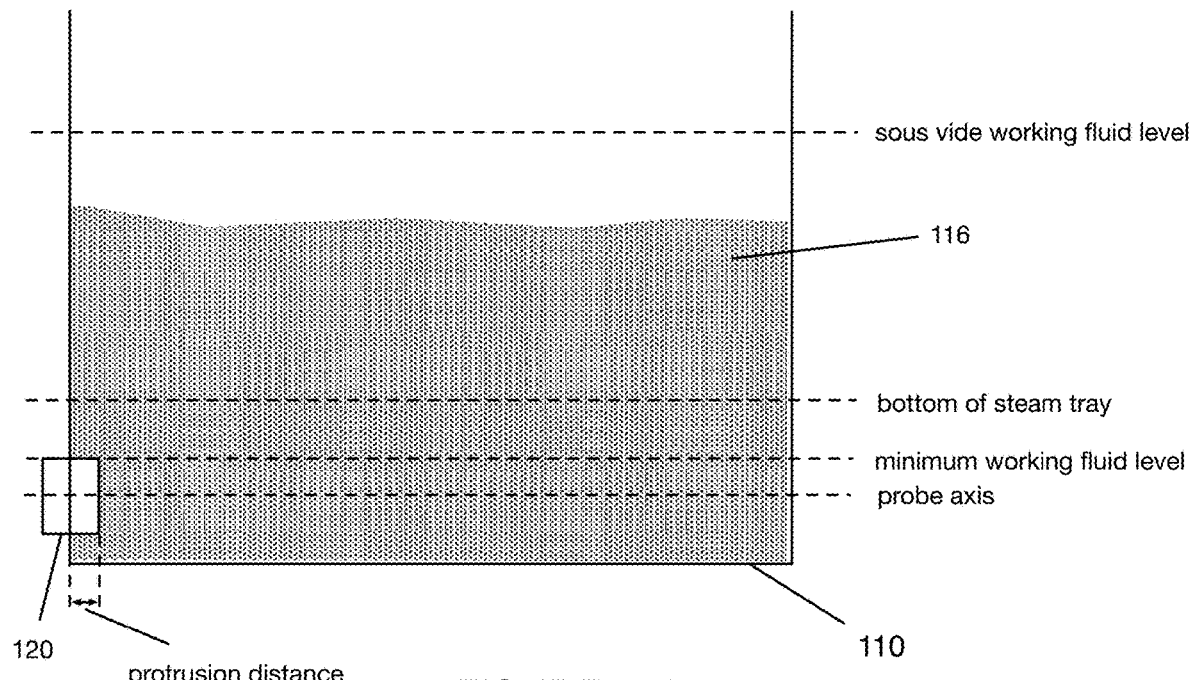
FIG. 13A is a side view schematic representation of working fluid levels for a variant of a vessel.
Figure 13B:
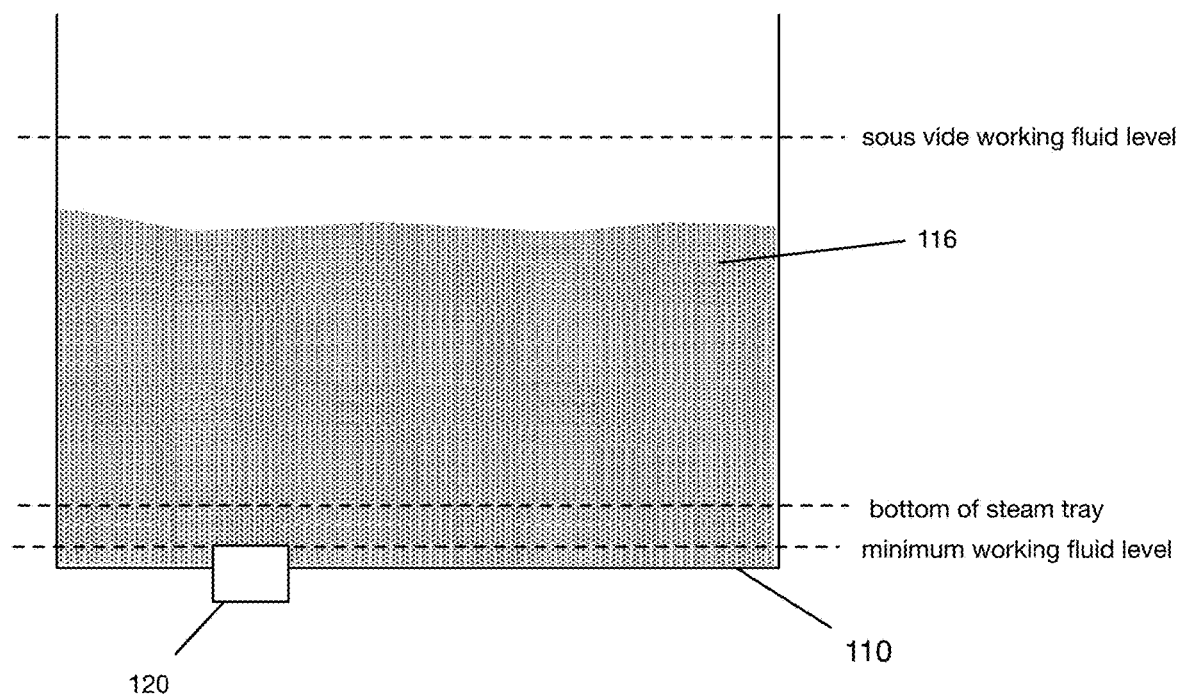
FIG. 13B is a side view schematic representation of working fluid levels for a variant of a vessel.

Second, variants of the cooking appliance accessory 100 can provide thermal contact of a temperature probe to a volume of working fluid inside a hot environment with low thermal resistance (e.g., below a threshold, using materials with high thermal conductivity). In such variants, the temperature can provide accurate temperature measurement (e.g., <1 deg C. accuracy) because the temperature probe is insulated from the vessel walls and the ambient air (which heat up at different rates than the working fluid due to the different thermal properties). In particular, working fluids with a high specific heat (e.g., water) can result in a temperature difference of 3-5 degrees or more between the vessel wall and the working fluid when heat is applied to the system. Additionally, the probe and electrical connections in such variants can be resilient to the high temperatures inside the oven (e.g., greater than 100 deg C.). In such variants, a spring-loaded snap fit ensures repeatable contact (e.g., with no air gap) between the temperature probe tip and the probe interface (e.g., probe port, thermowell, etc.) of the vessel. In variants, the cooking appliance accessory 100 can provide strain relief to the wire of the temperature probe with an excess length of wire/cable within the housing to the probe (e.g., internal "U" bend in the wire) to ensure minimal motion of the wire/cable outside of the housing, resulting from the travel of the spring-loaded contact. In variants ensuring thermal contact of the temperature probe with a volume of working fluid with low resistance, the probe (and/or internal interface of the probe interface) can be located below the working fluid line—examples of which are shown in FIGS. 13A and 13B.

Third, variants of the cooking appliance accessory 100 can be resilient to common user errors. In such variants, the cooking appliance accessory can include a fully encapsulated temperature probe. Such variants can be resilient to working fluid exposure such as fluid: droplets, spray, incidental submersion, dishwasher use, and/or other fluid exposure via an RTV and/or epoxy seal. In variants, the system can eliminate user errors resulting from improper thermal probe insertion, such as common errors associated with: the probe touching the walls of the vessel, the probe being displaced out of the fluid vessel (or working fluid), waterproofing the probe, and other additional challenges/common errors. In variants, the vessel, lid, and/or other components contacting the working fluid or foodstuff 118 can be dishwasher safe because they are manufactured from a dishwasher safe material/coating (e.g., stainless steel, glass, etc.), have no integrated electronics (e.g., wherein electrical or fragile components can be arranged within the temperature probe), and/or robust geometries that minimize debris retention. Additionally or alternatively, the vessel and/or temperature probe can be resilient to handwashing (e.g., which may be preferred over dishwasher cleaning for variants using a hard anodized coating on aluminum components) and/or incidental exposure to cooking fluids.

However, the systems and/or method can confer any suitable set of benefits.

3. System

The cooking appliance accessory 100 is preferably used with a cooking appliance 102 with a heating cavity (e.g., a connected oven), and can include: a vessel 110 and a temperature probe 130. The cooking appliance accessory 100 can optionally include: a lid 170, a tray 180, and/or a circulator 190. However, the cooking appliance accessory 100 can include any other suitable components. The cooking appliance accessory 100 functions to monitor and/or control the temperature of a volume of working fluid in a cooking appliance with a heated cavity.

Preferably, the cooking appliance is an oven, but can alternatively be any appliance with a heated cavity (e.g., oven, grill, etc.), heated cook surface (such as a cooktop), or other suitable appliance. The appliance is preferably a digitally controllable appliance, but can additionally or alternatively be a manually controlled appliance (e.g., which can be monitored by the system). The appliance preferably has an internal volume less than 2 cubic ft, however can be less than 0.5 cubic feet, 0.5 cubic ft, 0.75 cubic ft, 1 cubic ft, 1.25 cubic ft, 1.5 cubic ft, 1.75 cubic ft, 2 cubic ft, 2.5 cubic ft, 3 cubic ft, 4 cubic ft, greater than 4 cubic ft, and/or any other suitable volume or within a range bounded by any of the aforementioned values. Alternatively, the appliance can be a cooktop or heated surface defining an area of less than 1 square ft, 1 square ft, 2 square ft, 3 square ft, greater than 3 square ft, and/or any other suitable heated area. The cooking appliance preferably includes heating elements, which are preferably resistive heating elements, but can alternatively be inductive heating elements, gas burners, and/or other suitable heating elements. Most preferably, the heating elements are constructed of carbon fiber or quartz, but they can additionally or alternatively be manufactured from any suitable metal, metal alloy, ceramic, and/or other material. The heating elements can be located on the top, bottom, broad faces (front and/or back), narrow face(s), and/or other suitably located within the interior/exterior of the appliance. The heating elements can be individually controllable, controlled in banks, controlled as a unitary population, or otherwise controlled. In examples, the heating elements can be individually controlled to create an uneven, even, or other temperature profile within the cooking cavity. The appliance can optionally include one or more: convection elements (e.g., fans) to move air and/or other working fluids within the interior cavity, racks to support one or more cooking vessels in the interior of the appliance, integrated temperature sensors (e.g., to measure the temperature of the air within the oven, to measure the oven temperature), optical sensors (e.g., camera) to detect the presence of the vessel (and/or the lid, tray, foodstuff within the vessel, working fluid level, etc.), and/or any other suitable components. The optical sensor can be located: inside the cavity (e.g., along the top, bottom, left, right, back, front, door, corners, thresholds, and/or other location), on the top surface of the interior of the appliance cavity, optically connected to the appliance cavity, and/or otherwise suitably implemented. The cooking appliance can enable wired and/or wireless communication with the temperature probe. The appliance can include: an electrical jack in the appliance interior which connects via a wire/cable to the temperature probe, an electrical jack located on the exterior of the appliance, a wireless connection (e.g., via Bluetooth, WiFi, etc.), and/or any other suitable interface with the temperature probe, accessory, or other system. Preferably, the cooking appliance includes a processing module to execute S110, S130, S140, S140, S150, and/or S160, however some or all processing/control can be performed on a connected device (e.g., such as an external controller, user device, cell phone, tablet, etc.), and/or otherwise executed. In a specific example, the appliance can be the connected oven described in U.S. application Ser. No. 15/147,597 filed 5 May 2016 and/or the connected oven described in U.S. application Ser. No. 15/170,678 filed 1 Jun. 2016, each of which is incorporated in its entirety by this reference. In a second specific example, the appliance is a smart cooktop surface (e.g., with an induction burner).

The cooking appliance accessory 100 can include one or more components configured to retain food within the appliance's cooking cavity. The accessory can optionally function to retain cooking media (e.g., working fluid 116), maintain a cooking environment different from the cooking cavity, or perform any other suitable functionality. Examples of accessory components include: a vessel (e.g., a pot), a tray (e.g., a flat tray, a tray with individual cavities), or any other suitable components. The cooking appliance accessory can include or exclude a cover or lid that thermally or fluidly seals (or partially seals) the accessory.

The vessel (examples shown in FIGS. 5, 6A, 6B, and 16-18) functions to define a cavity configured to contain a volume of working fluid 116 and enable wet cooking with the appliance.

Figure 19:
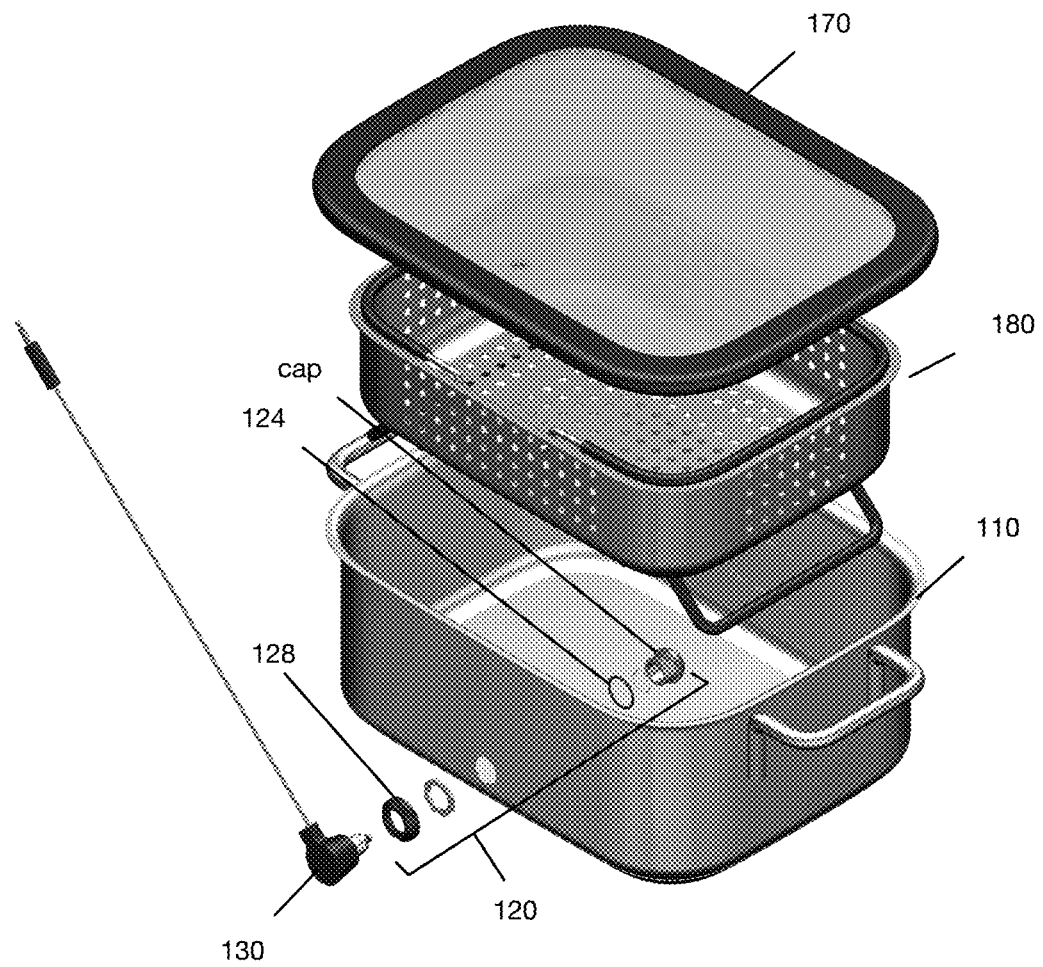
FIGS. 19 and 20 are exploded views of cooking appliance accessory examples.
Figure 20:
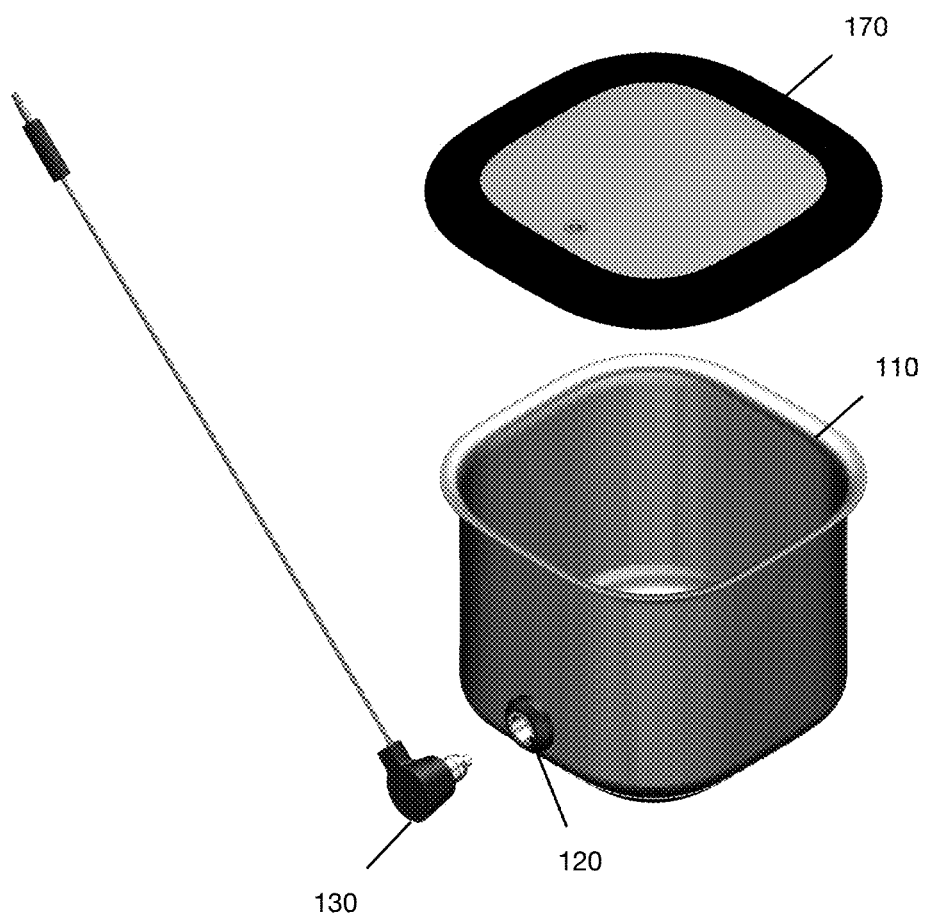

The vessel includes any suitable number of walls (e.g., 4, 5, 6, 8, etc.), which cooperatively enclose and contain the working fluid 116 within the interior of the vessel. The walls can include a base and any suitable number of side walls. The vessel can have any suitable number of side walls, such as: 1 cylindrical sidewall, 2 side walls in lens/vesica-piscis shape, 3 sides, 4 sides, more than 4 sides, and/or any suitable number of sides. The side walls of the vessel can be flat or curved, orthogonal to the bottom, at an obtuse angle to the bottom, and/or otherwise configured. The walls of the vessel can have the same or different thickness—the wall thickness can be <1 mm, 1 mm, 1.5 mm 2 mm, 1-2 mm, >2 mm, and/or any other appropriate wall thickness. The walls of the vessel cooperatively define an open-ended vessel cavity. In variants, the open top can be selectively closed or partially closed with a removable lid 170 (examples shown in FIGS. 5, 19, and 20). The lid can be separate (e.g., entirely removable), hinged, or otherwise couplable to the vessel. The lid and/or the vessel can include vents, valves, and/or other fluid regulator. The vessel can be rigid or can be flexible/shapeless. The vessel can be: cylindrical, prismatic (e.g., with rounded corners/edges, etc.), and/or any other suitable shape or geometry. The interior and/or exterior interfaces between vessel walls (e.g., corners, edges) can be: rounded (e.g., with a corner radius of 1 mm, 3 mm, 5 mm, 10 mm, 30 mm, 50 mm, radius within a range defined between any of the aforementioned values, etc.), arcuate, angled (e.g., have right angles, 30° angles, 45° angles, etc.), beveled, or have any other suitable geometry. The vessel can be: a pot (e.g., cylindrical, ovular, rounded prismatic, etc.), a pan, a tray, a dish, and/or any other suitable shape. In a first example, the container defines a rectangular prism (e.g., with arcuate/rounded intersections between the walls). In a second example, the container defines a cube (e.g., with arcuate/rounded intersections between the walls). In a third example, the vessel has an arcuate boundary between the base and a side wall, the arcuate boundary defined in a plane perpendicular to the base. However, the vessel can include any suitable walls in any suitable arrangement.

The vessel can be manufactured from any suitable material with any suitable thermal properties. Preferably, the material is thermally conductive, however part of the vessel can be manufactured from insulating materials (e.g., rubber covering handles, etc.). The vessel is preferably metal, such as stainless steel, but can alternatively be aluminum, any suitable metal/alloy, ceramic, polymer (e.g., thermoplastic, silicone, etc.), glass, and/or any other appropriate material with any appropriate thermal properties. The vessel can be coated with a nonstick coating (e.g., PTFE, anodized aluminum, ceramics, silicone, enamel, seasoning, etc.), visual coating (e.g., black, nonreflective, . . . ), thermally insulating coating (proximal the thermal probe hole), plated, and or uncoated (e.g., stainless). Alternatively, the vessel can include any appropriate food safe and/or dishwasher safe materials, coatings, or finishes. The base of the vessel can be weighted, flat, rounded, manufactured from the same/different material from the side walls, include induction coils, and/or be otherwise manufactured. However, the vessel can have any other suitable material composition.

The vessel can include any suitable number of handles 112 which function as lifting points for the vessel, which can reduce the risk of spilling hot/heavy fluid. In a first specific example, the vessel can include two opposing handles located proximate the top edge of the narrow face. In a second specific example, the vessel can include a handle protruding proximate the top edge of the broad face (e.g., on the same side as the probe port). In a third example, the vessel includes no handles. In a fourth example, a flange at the upper edge(s) of the vessel serves as a handle/lifting point. However, there can be any suitable number of handles in any appropriate configuration/position.

Preferably, the vessel has a volume greater than 50% the volume of the appliance cavity, but can alternatively be >95%, 95%, >90%, 90%, >80%, 80%, >70%, 70%, >60%, 60%, >50%, 50%, <50%, and/or any other appropriate percent volume relative to the volume of the appliance interior cavity. Alternatively, multiple vessels can collectively occupy this volume of the appliance cavity. The vessel occupying a greater percentage of the oven volume can result in greater efficiency in heating operations. The volume of the vessel can be: <1 L, 1 L, 2 L, 3 L, 5 L, 7 L, 10 L, >10 L, within a range bounded by any of the aforementioned values, and/or any other suitable volume vessel.

Figure 10:
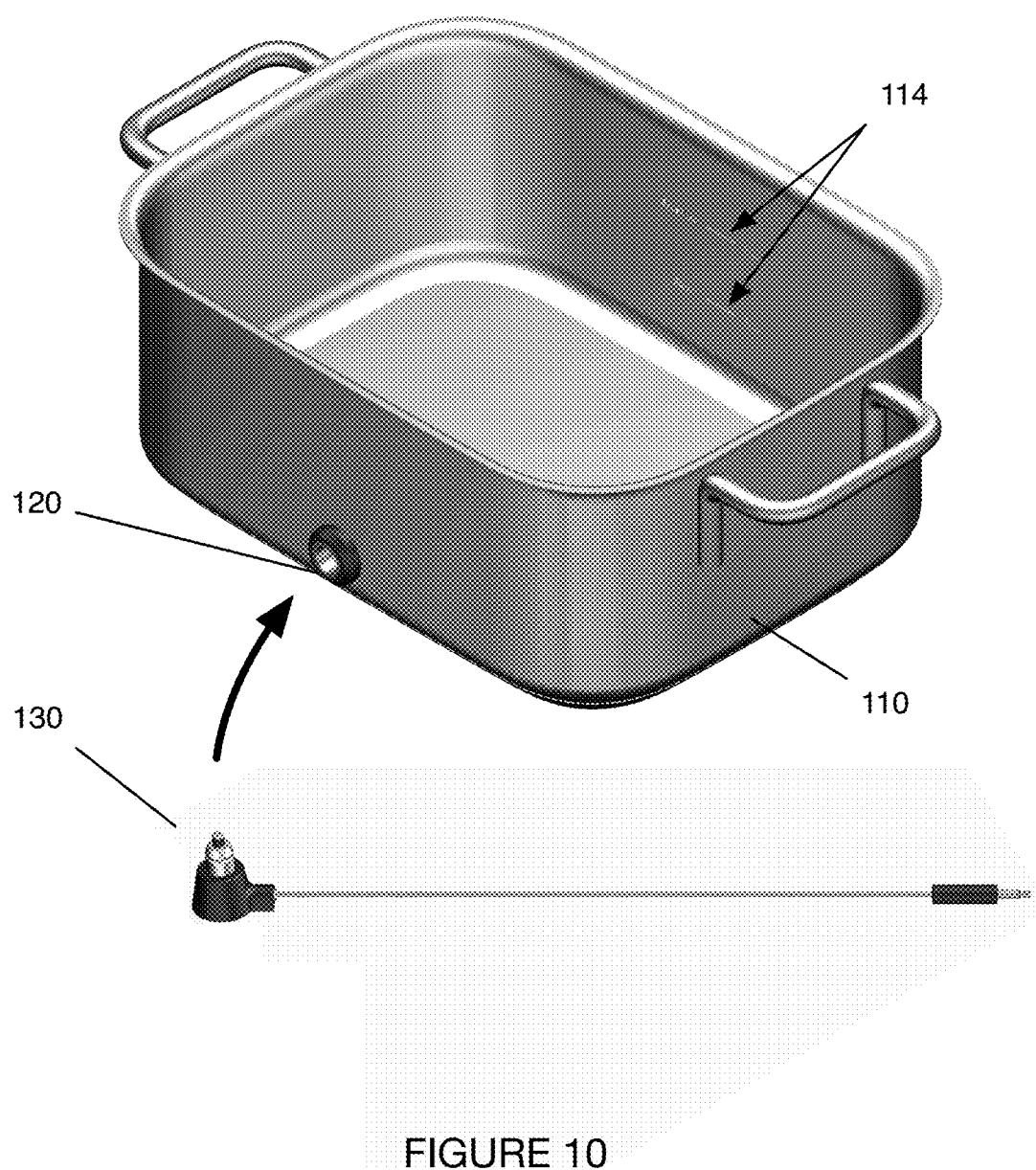
FIG. 10 is a schematic representation of a variation of the system.

The vessel can optionally include one or more volume indicators 114, which can include markings, engravings, stamped/pressed deformations in the material, the probe interface, and/or any suitable volume indicators. The volume indicators can be on the interior or exterior of the vessel. Volume indicators can indicate the maximum, minimum, recommended, and/or other appropriate working fluid level (or associated volume) for various operation modes (e.g., sous vide, steaming, rice cooking, etc.), examples shown in FIG. 10 and FIG. 16. The working fluid level can be determined based on: estimated cook time, the location of the temperature probe (and/or probe interface), the bottom of the steam tray, the size of the container (e.g., graded volume indications, such as: 1 Cup, 2 Cups, etc.), and/or any other any appropriate parameter(s).

In a first specific example, the volume indicator can indicate a minimum volume of working fluid which allows temperature monitoring with the temperature probe, and this minimum volume of working fluid can only steam more than a minimum amount of foodstuffs (e.g., accessory can steam a minimum of 7 cups of rice based on the position of the temperature probe). In a second specific example, the system can be used with a small vessel for cooking smaller amounts of foodstuffs (e.g., 2-7 cups of rice versus a minimum of 7 cups in a larger vessel). In a third example, the volume indicator can include graded volume measurements (e.g., cups, mL, ounces, etc.).

In an example, a working fluid level within the accessory can be optically observable relative to the volume indicator from the appliance exterior (e.g., through a transparent or translucent lid, using a camera within the appliance, etc.), which can be used for fluid level verification and/or appliance control.

The accessory can include one or more probe interfaces 120 (e.g., probe ports, thermowells), which function to establish a thermally conductive pathway between a temperature probe and the working fluid. The probe interface can also function to fluidly seal a portion of the vessel. In variants, the probe interface 120 can removably engage the temperature probe, and statically retain the temperature probe position. In variants, probe interface location can dictate the working fluid level(s) within the vessel. The probe interface is preferably located below the lowest operating level of the working fluid in all modes of use, but can alternatively be located below the starting level of the working fluid, and/or otherwise configured. The probe interface can be located at any appropriate height from the bottom of the vessel, such as at a height of: 1 cm, 2 cm, 2.5 cm, 3 cm, 4 cm, 5 cm, >5 cm, and/or any other appropriate height relative to the bottom of the vessel. The probe interface can be located at any appropriate depth of the fluid vessel (e.g., measured from the maximum fluid level, from the vessel opening, etc.), such as a relative depth of 95%, 90%, 85%, 80%, 75%, 50%, >95%, >90%, >85%, >80%, >75%, >50% and/or any suitable depth relative to the depth of the vessel. The probe interface can be located on the side of the vessel, on the base of the vessel, on the lid of the vessel, and/or otherwise suitably located. The probe interface is preferably located on a flat side of the vessel, but can alternatively be located on an edge, corner, and/or other part of the vessel. In an example, the probe interface can be located above an arcuate boundary (e.g., seal/gasket not contacting the arcuate boundary) between a sidewall and base of the vessel (examples shown in FIGS. 3, 4, and 17). In variants with directional accessories (e.g., dictating a predetermined accessory orientation within the cooking cavity), the probe interface is located on the side of the vessel facing the door of the oven (e.g., broad face facing the door) when inserted, however the probe interface can be otherwise suitably configured.

The probe interface can define an interior side (e.g., wetted portion) and an exterior side (e.g., dry portion). The interior side is preferably arranged within, thermally connected to, and/or fluidly connected to the vessel interior, but can be otherwise arranged. The exterior side is preferably arranged along the vessel exterior, and is preferably thermally connected to and fluidly isolated from the vessel interior. Alternatively, the exterior side can be entirely or partially: thermally isolated from the vessel interior and/or exterior, thermally isolated from or connected to the appliance's cooking cavity, and/or be otherwise thermally related to different volumes.

The probe interface preferably defines a probe cavity that functions to accept the temperature probe. The probe cavity is preferably defined by a probe interface housing, but can alternatively be defined by the vessel wall or by any other suitable component. The probe cavity preferably extends through the vessel wall (e.g., from the vessel exterior to the vessel interior), but can alternatively extend along the vessel wall (e.g., parallel the vessel wall, along the interior or exterior, etc.), or be otherwise arranged. The probe cavity is preferably fluidly contiguous with or defined by the exterior side of the probe interface, but can be otherwise arranged or configured.

The probe interface preferably protrudes into the interior of the vessel (e.g., extends into the vessel cavity; example shown in FIGS. 3B, 3C, 4, 13A, 13B, 17, and 18), which can reduce heat transfer from the vessel walls at point of temperature measurement (e.g., at the probe interface tip). The protrusion distance (an example is shown in FIGS. 13A and 13B) of the probe interface into the interior of the vessel can be: <5 mm, 5 mm, 10 mm, 15 mm, 20 mm, 25 mm, >25 mm, within a range bounded by any of the aforementioned values, and/or any other distance. The protrusion distance is preferably measured from the vessel wall to the apex or furthest extent of the probe interface (e.g., within the vessel), but can alternatively be measured from a thermal interface between the probe interface and the wall to the apex, from a base of the probe interface to the apex, from the base to the temperature probe contact point (e.g., on the dry side of the probe interface), or otherwise measured. However, the interface can alternatively be: flush with the interior surface of the vessel wall, recessed into the vessel wall (e.g., relative to the remainder of the wall interior surface), or otherwise arranged relative to the vessel cavity.

The probe interface can include a cap 122 (example shown in FIG. 19) which functions to thermally connect the temperature probe to the vessel cavity. The cap can additionally or alternatively function to fluidly isolate the temperature probe from the vessel cavity (e.g., wetted interior). In variants, the cap can form or function as a thermowell. The cap can be defined by the probe interface housing, or cooperatively define the probe interface housing and/or probe cavity. The cap can be rounded (e.g., catenoid, spherical sector, etc.), conic, convex, flat, chamfered, prismatic (e.g., cuboidal, hexagonal, octagonal, etc.), cylindrical, and/or have any other appropriate geometry (e.g., on the wetted or interior side). The cap is preferably the probe interface component that protrudes into the vessel cavity; alternatively, the protruding probe interface component can include: a portion of the cap, the cap and another segment of the probe interface, and/or other suitable portion of the probe interface. The cap preferably extends orthogonal to the vessel wall, but can additionally or alternatively be skewed, angled, and/or otherwise oriented. The cap can be offset from the vessel wall, be flush against the vessel wall, or be otherwise arranged. The cap diameter, radius, or primary dimension (e.g., perpendicular the protrusion axis; parallel the wall; etc.) can be a multiple of the cap protrusion distance (e.g., 0.5×, 1×, 2×, 2.5×, 3×, etc.), be a proportion of a wall dimension, be a multiple of the cap distance from the vessel bottom, or be otherwise dimensioned. The protrusion distance is preferably equal to or smaller than the cap diameter, but can alternatively be larger. Stubbier caps (e.g., shorter and/or wide caps) can be desirable in some variants to minimize the risk of cap damage (e.g., cap breakage) and food entrainment between the cap and the vessel base.

The cap can additionally define a cavity (e.g., concave cavity on the external side, dry side, or side opposing the convex geometry) configured to receive the temperature probe tip.

The cap preferably defines a measurement point that functions to thermally connect the vessel cavity with the vessel exterior. The temperature probe can thermally and/or mechanically contact the measurement point, or the measurement point can be otherwise used. The measurement point is preferably thermally conductive, but can alternatively be thermally insulated. The measurement point is preferably fluidly sealed (e.g., such that the working fluid does not contact the temperature probe), but can alternatively be fluidly open or accessible (e.g., always open; opened when a probe is biased against it; etc.). The measurement point can be defined on the exterior surface, interior surface, through the cap thickness, or on any other suitable cap surface. The measurement point is preferably the same material as the remainder of the cap, but can alternatively be a different material. The measurement point is preferably arranged on the apex of the cap, but can alternatively be arranged along a side of the cap (e.g., arcuately offset from the cap apex) or otherwise arranged.

A thickness of the cap (e.g., at the base of the probe cavity) preferably extends between the interior (wetted) side of the probe interface and the exterior (dry) side, establishing a thermal pathway therethrough. However, the cap can define any other suitable thermal pathway. The thickness of the cap is preferably reduced at the measurement point (e.g., relative to the cap base, at the base of the probe cavity), minimizing the thickness of material separating the temperature probe from the working fluid. However, the cap can have a uniform thickness, varying thickness, be thicker at the measurement point, or otherwise vary. The cap can include other assembly features, such as: bosses, extrusions, tapers, or other features to self-locate relative to a hole in the side of the vessel during assembly; threads (e.g., to interface with an exterior body such as a retention nut); a groove, recess, channel, and/or other feature to interface with a fluid seal; and/or any other appropriate features. The probe interface can be manufactured by any appropriate process(s) and from any appropriate material(s). In a first variant, the cap and the vessel are manufactured as a unitary piece (e.g., cap stamped/molded into the vessel). In a second variant, the cap is assembled into an aperture in the vessel.

The cap can be made of metal (e.g., aluminum, stainless steel, copper, etc.), ceramic, plastic, a combination thereof, and/or any other appropriate material. The cap is preferably uncoated, but can alternatively be nickel plated, zinc plated, non-stick coated, anodized, and/or otherwise coated. The cap is preferably constructed to provide low thermal resistance between the temperature probe (on the dry side of the cap) and the working fluid (on the wetted side of the cap). The cap can have a thermal conductivity of less than 10 W/m-K, 10 W/m-K, 14 W/m-K, 14.3 W/m-K, 14.4 W/m-K, 15 W/m-K, 40 W/m-K, 50 W/m-K, 60 W/m-K, 100 W/m-K, 180 W/m-K, 200 W/m-K, 230 W/m-K, 240 W/m-K, 380 W/m-K, 390 W/m-K, 400 W/m-K, greater than 400 W/m-K, any range bounded by the aforementioned values, and/or any other suitable thermal conductivity.

In a first variant, the cap is attached via a retention nut 126. The retention nut can be a hex nut or other nut-fastener, but can alternatively be a specialized nut requiring specialized tooling to attach/remove (e.g., specific pin holes, etc.; nut cylindrical about insertion axis, no flats on nut which defining a normal vector radially relative to fastening axis, no diametrically opposing flats on nut, etc.) to prevent accidental removal. The retention nut can be used with washers, lock washers, nylon inserts, cotter pins, threadlock, and/or any other appropriate components. The retention nut can be attached on an interior (e.g., wetted side) of a vessel wall or an exterior (e.g., dry side) of a vessel wall. Alternately, the cap can be attached with any suitable exterior body, which can be threaded to the cap (e.g., retention nut), adhesively bonded to the cap, and/or otherwise suitably connect the cap (e.g., via a press fit/snap fit).

In the first variant, one or more seals 124 can function to prevent leakage around the cap. The seal(s) can optionally function to thermally insulate the cap from the fluid vessel wall. The seal can be any suitable material such as: silicone, RTV, any other appropriate rubber, epoxy, other sealing or bonding agent. In variants, the seal is a gasket. In a specific example the gasket is an O-ring, which provides the added benefit of having no specific rotation orientation required for assembly. Preferably, the seal nests inside a groove, channel, or inset portion of cap, but can alternatively seat on the nut side, span the vessel wall, and/or otherwise seal the cap. Most preferably, the seal is inset from (does not sit proud of) the cap in the assembled configuration (example shown in FIG. 4). In a first example, where the seal is formed with a compressible material (e.g., rubber gasket), the seal is inset from an outer diameter of the cap (e.g., adjacent to the wall), such that when compressed the seal has an outer diameter which is strictly less than the outer diameter of the cap. In a second example, where the seal is formed with a compressible material (e.g., rubber gasket), the cap can include a flange which seats against the vessel wall or nut and which extends through a partial thickness of the (uncompressed) seal. Accordingly, when the seal is compressed (e.g., such as by fastening a threaded cap using a nut), the length of the flange sets a minimum compressed thickness of the seal, since compression of the seal will terminate when the flange abuts a rigid component (e.g., vessel wall, nut, etc.)— thereby ensuring that the seal cannot be over-compressed. Alternatively, the seal can be compressed according to a predetermined torque specification or a compression specification, and/or otherwise suitably compressed.

In the first variant, a nut cover can function to insulate the nut, seal, and/or cap from the heated cavity of the appliance (e.g., oven), and can additionally or alternatively function to prevent accidental removal of the retention nut by providing positive locking. The nut cover can be manufactured from a polymer (e.g., silicone rubber, plastic, etc.), metal, and/or any other appropriate material.

In a second variant, the cap is attached via a bonding agent or other adhesive. In a third variant, the cap is welded into place.

The probe interface can include a thermal insulation layer 128 (examples shown in FIGS. 3A-C, and 19) which functions to increase the thermal resistance between the ambient environment (e.g., oven air, wetted exterior of the vessel, etc.) and the cap. Accordingly, the thermal insulation layer can improve the accuracy of the temperature measurements of the working fluid by reducing the influence of the external influences—which may result in a non-uniform temperature distribution between the vessel wall(s), temperature probe components, and working fluid. The insulation layer can include the nut cover, seal (e.g., gasket), and/or any other suitable components. The insulation layer can additionally interface with the grip and/or other thermally insulating materials of the probe interface housing. The thermal pathways from the ambient surroundings and/or vessel wall(s) to the cap (e.g., fluidic exterior, from heat source, etc.) of the probe interface preferably pass through a thickness of the thermal insulation layer. In a specific example, during initial heating, the temperature of the air within an oven and the vessel heat up more quickly than the working fluid because they have a lower specific heat and/or thermal capacity. This results in a temperature gradient between the ambient air (and walls of the vessel) and the cap. By completely enclosing the dry side of the cap in the insulation layer of the probe interface (e.g., where the temperature probe forms a part of the insulation layer) and/or arranging the insulation layer between the cap and the surroundings, the cap is less sensitive to such temperature gradients.

The components of the insulation layer are preferably thermally insulating and/or low thermal conductivity (e.g., relative to the cap and/or probe tip). The insulation layer components can each have a thermal conductivity of 15 W/m-K, 5 W/m-K, 1 W/m-K, 0.83 W/m-K, 0.5 W/m-K, 0.25 W/m-K, 0.1 W/m-K, 0.05 W/m-K, 0.01 W/m-K, less than 0.01 W/m-K, any range bounded by the aforementioned values, and/or any other suitable thermal conductivity. Preferably, the insulation layer has a thermal conductivity which less than half the thermal conductivity of the tip and/or cap. More preferably, the insulation layer has a thermal conductivity which is less than one-tenth of the thermal conductivity of the tip and/or cap. In a specific example, the insulation layer has a thermal conductivity which is two orders of magnitude less than the thermal conductivity of the tip and/or cap. However, the thermal insulation layer can include any suitable components with any suitable thermal conductivity.

In a specific example, the seal of the probe interface can thermally insulate the cap from the walls of the vessel (and/or the nut) in addition to fluidly isolating the dry portion of the cap from the wet portion of the cap.

The probe interface can optionally include a retention mechanism 160 (an example is shown in FIG. 3C) which functions to retain the temperature probe (e.g., engagement mechanism housing, plunger) relative to the vessel. The retention mechanism can be a rigid component or feature, such as a groove, inset face, threads, cavity, retention pin or other feature; a deformable component, such as a retaining ring (e.g., snap ring), which contacts an opposing feature of the probe interface housing (e.g., female side on the cap/male side on the housing, male side on the cap/female side on the housing, etc.); a magnetic element, such as a permanent magnet that attracts the temperature probe; an external clip; a pin (e.g., a cotter pin); or any other suitable retention mechanism. In a first example, a retention spring nests (e.g., rotatably, movably, floating, etc.) inside an interior groove on the cap and snaps into a corresponding groove on the housing of the engagement mechanism when the probe tip is depressed against the cap. In a second example, the temperature probe (e.g., housing) twists into the cap (e.g., via threads and/or suitable retention features. In a third example, the user inserts a pin orthogonal to the probe axis, wherein the pin passes through a thickness of the cap and protrudes into a thickness of the engagement mechanism housing. In a fourth example, a retention spring nests (e.g., rotatably, movably, floating, etc.) inside an exterior groove on the housing of the temperature probe and snaps into a corresponding groove on the interior of the cap when the probe tip is depressed against the cap.

In one variant, a geometry of the probe housing is (substantially) radially symmetric forward of an exterior retention groove on the housing (e.g., between the exterior retention groove and the probe tip), and the housing includes a cross-sectional profile defining a local maximum in a cross-sectional thickness forward of the groove (e.g., where probe tip end is the forward end and housing is rearward relative to the probe tip), wherein the cross sectional profile is rounded proximal the local maximum, wherein the housing tapered towards the tip forward of the local maximum, wherein the housing is tapered rearward of the local maximum towards a local minimum at a base of the exterior retention groove. In a first example, a taper angle between the local minimum and local maximum is less than 90 degrees and greater than a minimum threshold, wherein the minimum threshold is determined based on: a friction coefficient between the retention spring and the groove; a first spring constant of the spring; a second spring constant of the retention spring; and the difference between the first distance and the second distance. Additionally, the minimum threshold of the taper angle is additionally determined based on a backout force threshold (e.g., 10N, 20 N; for a user to extricate the temperature probe from the retention mechanism etc.). However, the housing can include any other suitable retention mechanism.

Figure 7A:
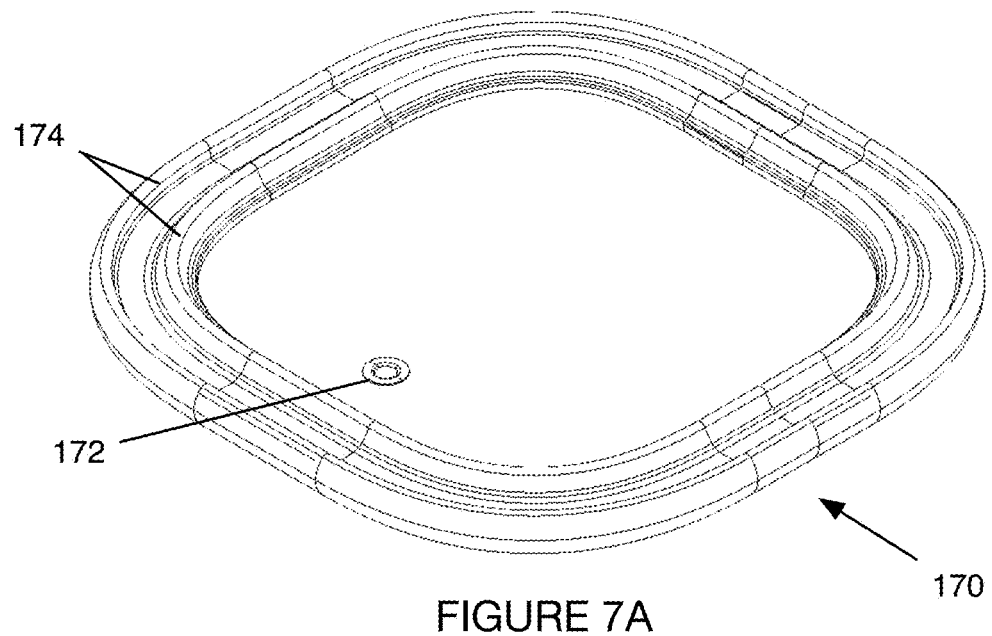
FIG. 7A is an isometric view of a variant of the lid.
Figure 7B:
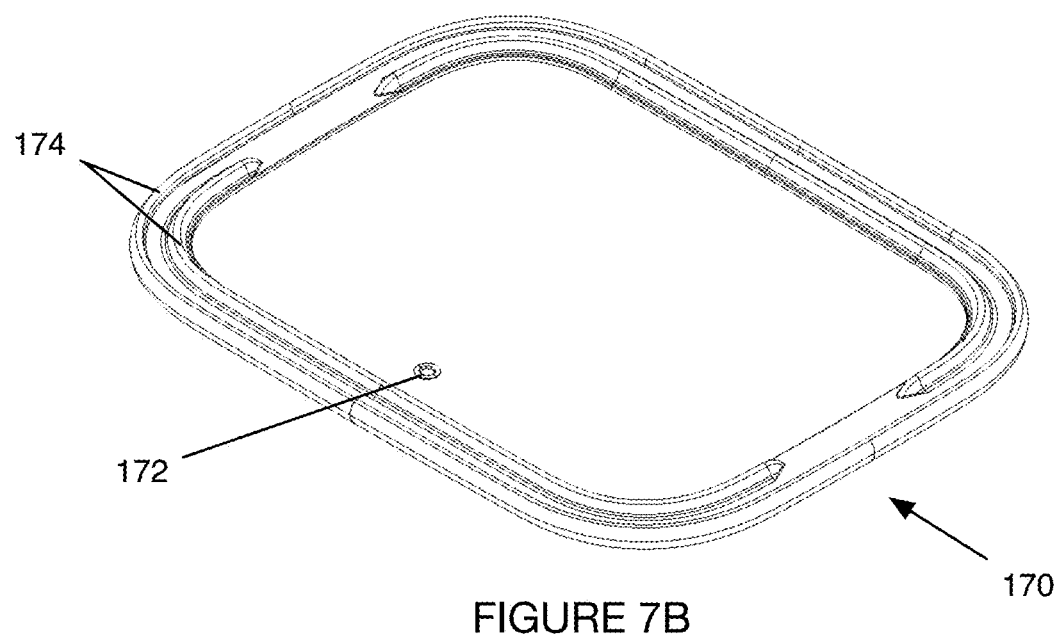
FIG. 7B is an isometric view of a variant of the lid.

The accessory can optionally include a lid (examples are shown in FIGS. 7A and 7B) which functions to partially or fully encapsulate the working fluid in the vessel. The lid can enable pressure buildup for "steaming" cooking processes and/or pressure cooking processes (e.g., approximately 14 psi, 15 psi, 20 psi, 30 psi, a range therebetween, etc.). Alternatively, the lid can hold a vacuum within the vessel (e.g., a pressure less than atmospheric pressure), and/or allow the vessel pressure to equilibrate with the ambient environment. In a specific variant, the lid can include a vent 172 (e.g., hole, pressure release valve, etc.) which can eject steam from the vessel. Alternatively, the lid can exclude a vent, and allow pressure relieve through a periphery of the lid and/or under a gasket of the lid (e.g., with sufficient pressure to overcome a seal created by the gasket, weight of the lid, and/or friction of the lid against the vessel). In a second variant, the lid can fully seal/lock to enable pressure cooking.

The lid is preferably glass, but an alternatively be constructed of a food safe plastic, ceramic, metal, and/or other appropriate material. The lid can include a lid seal 174 (e.g., gasket) which interfaces with (e.g., seals against, retains, etc.) the upper edge, lip, flange, and/or other feature of the vessel, which can prevent leaks at the interface of the lid and the vessel. Preferably, the seal is silicone rubber, but can additionally or alternatively be the same material as the lid and/or any other suitable material. The seal is preferably flexible and/or elastomeric, but can additionally or alternatively be semi-rigid, rigid, and/or otherwise deformable. In a specific example, the seal can include a gasket around the perimeter of the lid, which can mechanically retain the lid against the vessel walls. The lid can be: transparent, translucent, frosted, opaque, and/or have any other optical properties. The lid can include a locking mechanism such as a: snap lock, press-fit/frictional lock, latch, hinge, bayonet lock, and/or other attachment mechanism/fasters interfacing with the fluid vessel. However, the lid can alternatively exclude a locking mechanism and/or rest atop the vessel (e.g., against an upper lip or upper periphery of the vessel).

In variants, the lid can be sized to extend beyond an upper flange of a tray and/or a lip (or upper flange) of the vessel, which can provide users access to the underside of the lid along one or more sides of the vessel. Additionally, for trays suspended from the side wall(s) of the vessel, lid extension beyond the attachment point(s) of the tray can provide a fluid seal along all or the entirety of the lip of the vessel.

Figure 8A:
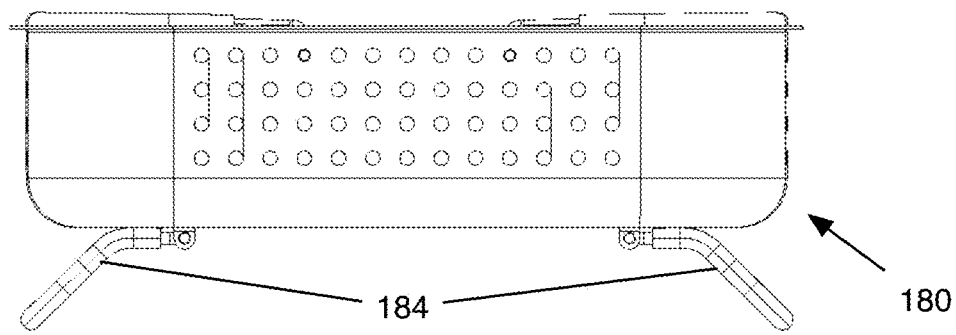
FIG. 8A is a side view of a variant of the tray with extended legs.
Figure 8B:
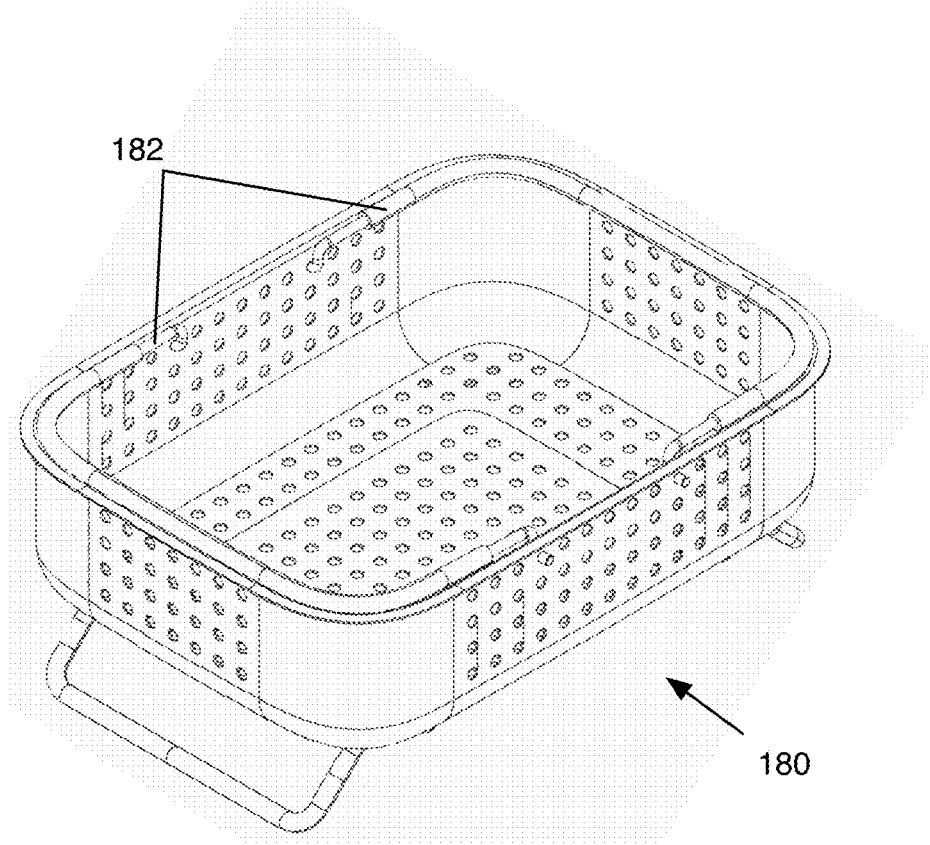
FIG. 8B is an isometric view of a variant of the tray with handles.
Figure 9:
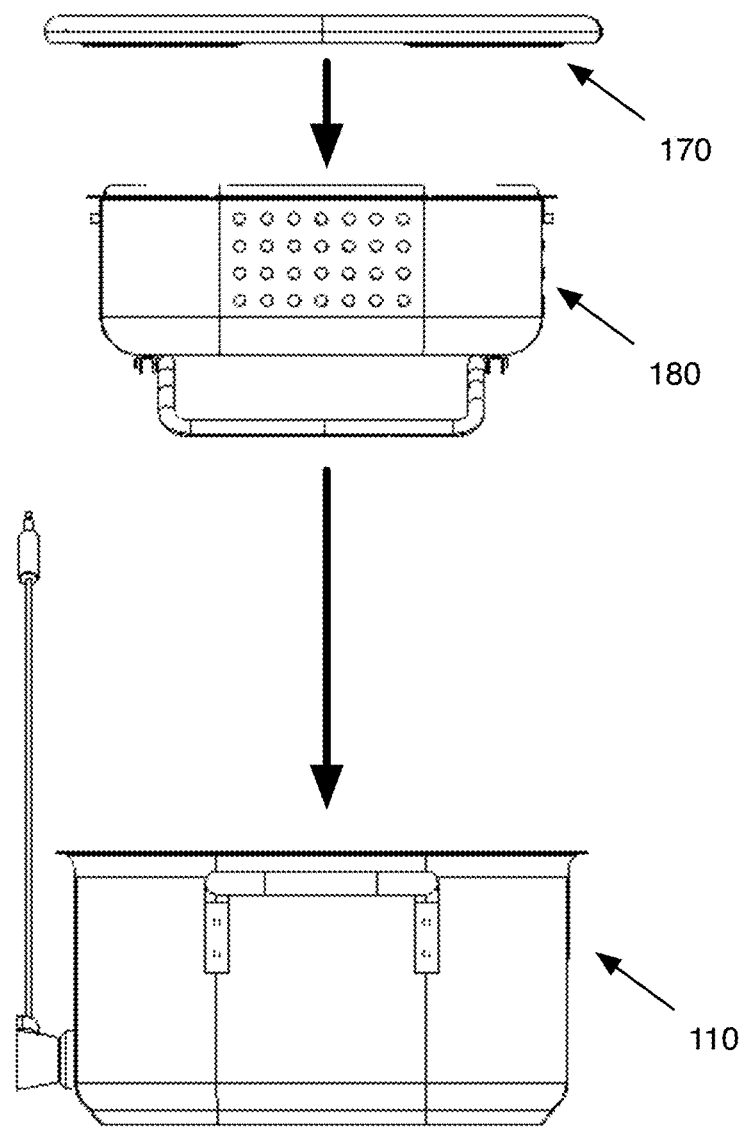
FIG. 9 is a side view of a variation of the system.

The accessory can optionally include a tray (e.g., steam tray) which functions to stand food off the bottom of the fluid vessel for steaming applications (examples are shown in FIGS. 8A, 8B, and 9). The tray can be disposed above the water marking (and above the probe interface), but can alternatively be disposed at the water marking, below the water marking, and/or have any other appropriate proximity relative to the water, bottom of the vessel, or top of the vessel. In a first variant, the tray can include legs 184 which extend to the bottom of the vessel. The legs can fold out (e.g., be hinged), but can alternatively be rigid, selectively attached, and/or otherwise suitably configured. In a second variant, the tray can be suspended from the sides (e.g., top edge) and/or lid of the fluid vessel. In a specific example, the tray can be a flexible material which is retained by an entire lip of the vessel, extending circumferentially around the upper lip/flange of the vessel. In the second variant, the tray can include lifting flaps or handles 182 on opposing ends of the vessel, a flange extending beyond the lip of the vessel (e.g., which can provide user access to an underside of the flange), and/or other suitable lifting components/features. In the second variant, the tray can be retained by the lid (e.g., where the lid gasket compresses and/or deforms to accommodate the geometry of the tray), simply supported by the walls of the vessel, and/or otherwise suitably suspended within the vessel.

The tray is preferably sized to fit within the fluid vessel and has a length and/or width near the size of the vessel (interior) in order to maximize the amount of food that can be retained. The tray can have a similar geometry to the vessel interior (e.g., rectangular for a rectangular vessel, circular for a circular vessel, etc.), have a different geometry than the vessel, and/or have any other suitable geometry. The tray can optionally be collapsible (e.g., with fanning side walls), foldable, and/or otherwise compacted for easier storage.

The tray can be constructed from a rigid or flexible material (e.g., silicone). The tray can be constructed of metal (e.g., stainless steel, aluminum), plastic, and/or polymer (e.g., silicone), but can alternatively be any other food safe material, dishwasher safe material, and/or other suitable material. The tray is preferably perforated, slotted, and/or otherwise configured to allow fluids (e.g., water/steam) to pass through the thickness of the material-which can be advantageous in steaming processes—but can additionally or alternatively be solid, continuous, unperforated, grooved, or include any other suitable feature.

However, the tray can otherwise position food within the vessel.

The accessory can optionally include a circulator which functions to circulate working fluid within the vessel. The circulator can be located within the vessel, outside the vessel, connected to the lid, connected to the cooking appliance interior (e.g., oven interior), fluidly connected to the working fluid, and/or otherwise implemented. In a specific example, the circulator includes a magnetic stirrer (e.g., wherein the appliance generates a rotating magnetic field). In a second example, the circulator includes an impeller (e.g., driven by an electric motor in the appliance, thermally driven, etc.). Alternatively, the system can exclude a circulator and rely on uniform heating of the working fluid and/or natural convection of the working fluid to generate the desired cooking results.

The accessory can optionally include one or more accessory identifiers, which functions to enable a secondary system, such as the cooking appliance, the temperature probe, a user device, or other system, to identify the accessory. The accessory identifier can be: unique to the accessory instance (e.g., globally unique), unique to the accessory class (e.g., all pots or the same make or model share the same identifier), unique to the user, nonunique, or otherwise related to other accessories. The accessory identifier can be: an optical pattern (e.g., logo, barcode, QR code, perforations of the tray, etc.) printed feature, engraved, adhered, or otherwise coupled to the accessory; an electromagnetic identifier (e.g., RF tag, NFC tag, etc.); the accessory geometry; or other identifier. The accessory identifier can be arranged: along the accessory top (e.g., lid, lip), side, bottom, front, back, interior, exterior, and/or along any other suitable position. The accessory identifier can be thermally insulated or exposed.

The cooking appliance accessory 100 can include a temperature probe, which functions to monitor the working fluid temperature. The temperature probe can be mechanically and/or thermally connectable to the probe interface (e.g., via the engagement mechanism). The temperature probe preferably thermally and mechanically connects to the exterior side of the probe interface (e.g., within the probe cavity), but can be otherwise coupled to the probe interface. Preferably, the temperature probe is modular and/or removable from the cooking appliance and/or cooking accessory, such that a failure of the temperature probe is isolated and easily serviceable. In some applications, decoupling the temperature probe can be beneficial because temperature probes can have higher failure rates than the vessel and/or other cooking appliance components.

The temperature probe includes a temperature sensor 132, which functions to sample the temperature of the tip of the temperature probe. The temperature sensor is preferably a glass thermistor, but can additionally or alternatively be a thermocouple, resistance thermometer, and/or any other appropriate temperature sensor. The temperature sensor and/or temperature probe can have any suitable measurement accuracy and/or measurement precision, such as within: 0.1 deg C., 0.2 deg C., 0.5 deg C., 1 deg C., 1.5 C. deg, 2 deg C., >2 deg C., within any range bounded by any of the aforementioned values. In a specific example, the system can sous vide an egg to within 0.1 deg internal temperature accuracy (e.g., 63.0 deg C., 64.0 deg C., 64.8 deg C., 65.0 deg C., 68.4 deg C., etc.).

The temperature probe (and temperature sensor therein) can be communicatively connected to the cooking appliance by a wired or wireless data link. In a first variant, the temperature probe includes a wire/cable 135 and a jack (e.g., male connector end) which connects to a corresponding jack (e.g., female connector end) in the cooking appliance. The wire/cable can optionally include a protective sleeve, coating, and/or other insulation for resilience to cooking temperatures. In variants, the body of the jack (male and/or female ends) can be constructed from a high temperature plastic, thermal insulation, and/or other suitable materials. In a second variant, the temperature probe is wirelessly connected via Bluetooth, Wi-Fi, or other data connection to a portable device, control processor, and/or cooking appliance. In the second variant, the temperature probe can be operable in conjunction with an external power source (e.g., power connection, battery, etc.), an external processing system, and a communication module enabling wireless communication (e.g., with the cooking appliance and/or platform connected to the cooking appliance).

The temperature probe can include a connector 136 which functions to connect the temperature probe (and temperature sensor therein) to the appliance and/or a separate temperature logger. The connector can be: a plug or socket connector, a crimp on connector, a soldered connector, a binding post, a screw terminal, a ring and spade connector, a blade connector, twist-on wire connector, alligator clip, and/or other suitable connector. In a first specific example, the connector is a removable jack.

The temperature probe can include a housing 140 which functions to house the temperature sensor and/or communicative connections thereto. Additionally or alternatively, the housing can thermally insulate the temperature probe from an ambient environment (e.g., wetted fluid exterior of the accessory, oven air). The housing preferably defines a first end and a second end, with the probe (tip) arranged proximal the first end, and the connector (and/or wire/cable extending to the connector) arranged proximal the second end. The housing can include any suitable geometric features such as: bosses, extrusions, tapers, chamfers, or other features to self-locate relative to the probe interface; a groove, recess, channel, and/or other feature to interface with a retention mechanism; and/or any other appropriate features. Preferably, the housing is rounded and/or tapered toward a central axis (travel of the plunger), however the housing can be otherwise configured. In a specific example, the housing can include an abutment portion configured to extend into an interior of the probe cavity of the probe interface. The abutment portion can include a cross-sectional geometry substantially consistent with geometry of the probe interface (e.g., offset by a nominal clearance distance; outer diameter of the abutment portion equals the inner diameter of the probe interface less twice the clearance distance; etc.). The housing can include any suitable materials. The housing can include metal (e.g., aluminum, stainless steel, copper, etc.), ceramic, plastic (e.g., PEEK), rubber, and/or any other appropriate material. The housing can have any appropriate material coating. Preferably, the housing is uncoated, but can alternatively be nickel plated, zinc plated, powder coated, non-stick coated, anodized and/or otherwise coated.

The housing can optionally include a backing 146 which functions to encapsulate the temperature probe inside of the housing in the direction of assembly and can additionally or alternatively function to retain one end of a plunger spring. The backing can be the same material as the housing or can be a different material. The backing can be made of: metal (e.g., aluminum, stainless steel, copper, etc.), ceramic, plastic (e.g., PEEK), and/or any other appropriate material. The backing can be attached by a snap fit, bonding agent, fastener, or other component/agent, can be encased by an overmold (e.g., grip), and or otherwise configured. Preferably, the backing is assembled proximate the second end of the housing, however it can be located proximate to the connector and/or wire/cable of the temperature probe, the wire/cable can pass through a thickness of the backing, and/or the backing can be otherwise located relative to the housing.

The temperature probe preferably includes a plunger 150 which functions to establish a conductive thermal pathway between the temperature sensor and the probe interface (e.g., thermally or mechanically connect the temperature sensor with the cap of the probe interface). The plunger can include a tip 152 and a body 154. The tip functions thermally connect the temperature sensor to the probe interface of the vessel (e.g., cap at a base of the probe cavity). The tip is preferably constructed from a material with a high thermal conductivity and, accordingly, provides low thermal resistance between the cap and the temperature sensor (e.g., improving measurement accuracy, lox less thermal resistance relative to thermal circuit to ambient, etc.). The tip can be connected to the temperature sensor using any suitable adhesives (e.g., epoxy, thermal epoxy), thermal gap fillers, mechanical fasteners/crimping, and/or any other suitable techniques. However, the tip can be otherwise suitably conductively connected to the temperature sensor. The tip can have a thermal conductivity of less than 10 W/m-K, 10 W/m-K, 14 W/m-K, 14.3 W/m-K, 14.4 W/m-K, 15 W/m-K, 40 W/m-K, 50 W/m-K, 60 W/m-K, 100 W/m-K, 180 W/m-K, 200 W/m-K, 230 W/m-K, 240 W/m-K, 380 W/m-K, 390 W/m-K, 400 W/m-K, greater than 400 W/m-K, any range bounded by the aforementioned values, and/or any other suitable thermal conductivity. However, the plunger can include any other suitable tip, and/or plunger tip can otherwise suitably refer to the region of the plunger which contacts the probe interface.

The body 154 of the plunger mechanically supports the tip 152 and connects the tip to the housing. The tip can be threaded into the body, snap into the body, adhesively bonded to the body, integrated into the body, and/or otherwise suitably connected to the body. The body can be retained by the housing, supported by the housing (e.g., cantilevered), and/or otherwise suitably implemented. Preferably, a partial length of the plunger body is arranged within an interior of the housing, and/or the geometry of the housing constrains the body of the plunger to translation along (and/or rotation about) a single axis. The body of the plunger can have any appropriate geometry with a circular cross section, annular cross section, square cross section, and/or other suitable geometry. Preferably, the body of the plunger is hollow, allowing the wire/cabling connection of the probe to extend therethrough, but can otherwise enable connectivity of the temperature sensor through the interior of the housing. The body of the plunger can be constructed from any appropriate material such as: high temperature plastic, metal (e.g., stainless steel, aluminum, etc.), ceramic, glass, any combination thereof, and/or any other appropriate material. In a specific example, the probe has a plastic body (e.g., PEEK) and has a metal probe tip, wherein the metal probe tip can be assembled into the probe via a snap/press fit, bonding agent, threaded fastening (e.g., male threads on the tip and female threads on the body or vice versa), or other assembly technique. Preferably, the tip is bonded and/or otherwise mechanically/thermally connected to the temperature sensor (e.g., via thermal paste, thermal epoxy, etc.) to ensure conductive thermal contact (e.g., no air gap).

In a second specific example, the tip and the body can be integrated as a single component and/or formed with the same material.

The plunger can have any suitable arrangement relative to the housing of the probe engagement mechanism. Preferably, the plunger extends axially relative to the housing and in an interior of the housing, however a portion of the plunger can protrude outwards of the housing (e.g., in an axial direction), can be arranged radially outward of a portion of the housing, and/or be otherwise arranged relative to the housing.

In a first variant, the plunger exerts pressure on the probe interface via a plunger spring 134, which biases the plunger towards an extended configuration (e.g., distal the first end of the housing, away from the probe base, etc.). The plunger spring is preferably a compression spring, but can additionally or alternatively be a tensile spring, torsion spring, gas spring, flat spring, machined spring, serpentine spring, garter spring, and/or other suitable type of spring. The plunger spring preferably engages a face, flange, or feature of the plunger opposing the probe tip, but can alternatively supply force via a linkage, feature of the plunger directed toward the probe tip, and/or otherwise operate. In a second variant, the plunger is constructed from a deformable/compressible material and can be an individual component or can be a deformable section of the housing, probe tip, and/or other suitable component.

Preferably, the maximum travel and/or elastic deformation distance of the plunger (e.g., plunger spring) is greater than the travel of the plunger when inserted and/or required to engage to the retention mechanism (e.g., lock in place), which ensures that repeated insertion (e.g., 100 cycles, 1000 cycles, 10000 cycles, 100000 cycles, etc.) does not result in permanent deformation of the spring and/or failure of the probe engagement mechanism. However, the plunger travel and/or elastic deformation can be less than the plunger's insertion travel distance, and/or be otherwise configured.

Figure 14A:
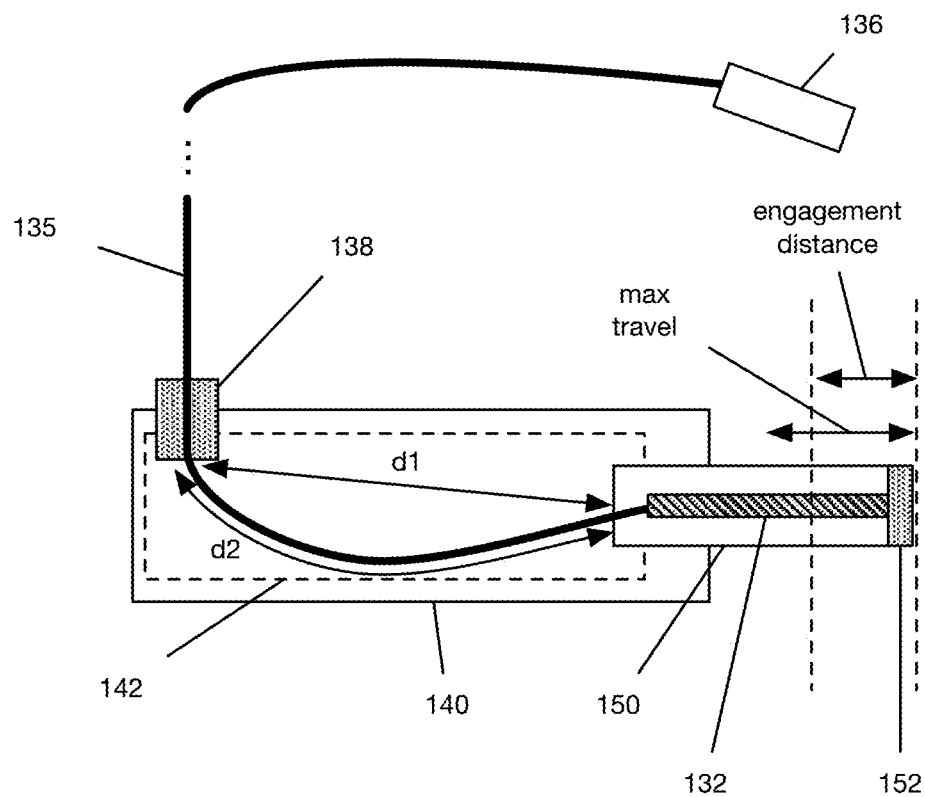
FIG. 14A is a schematic representation of a variation of the engagement mechanism.
Figure 14B:
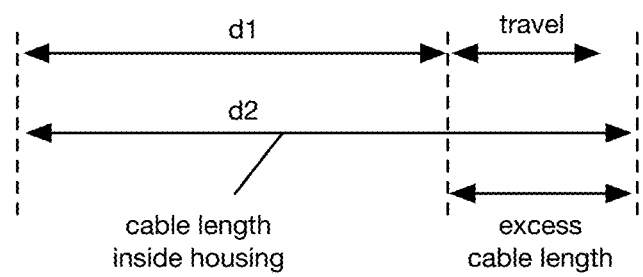
FIG. 14B is a schematic representation of the relative cable length inside the housing compared to the plunger travel distance from the variation of the engagement mechanism in FIG. 14A.
Figure 15:
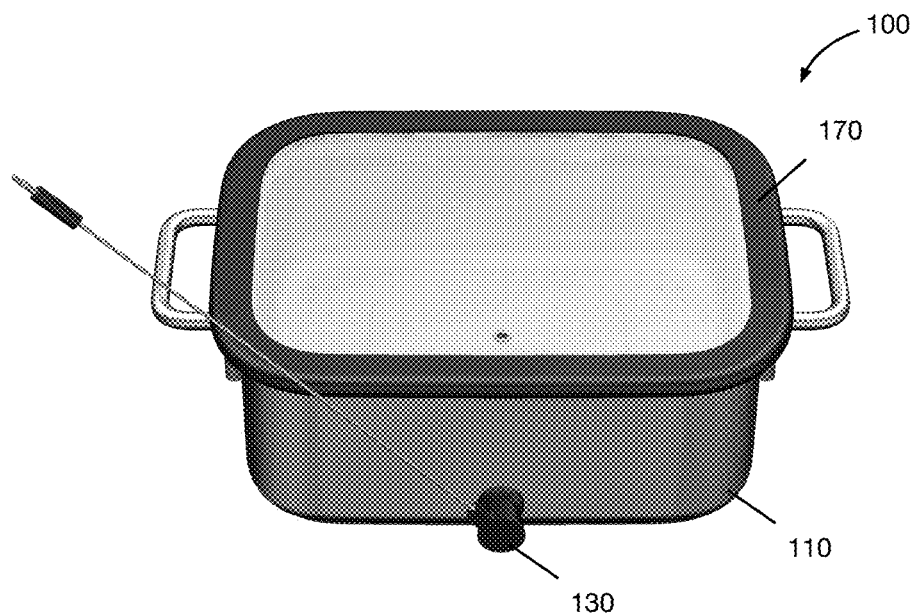
FIG. 15 is an illustrative example of an assembled cooking appliance accessory.
Figure 16:
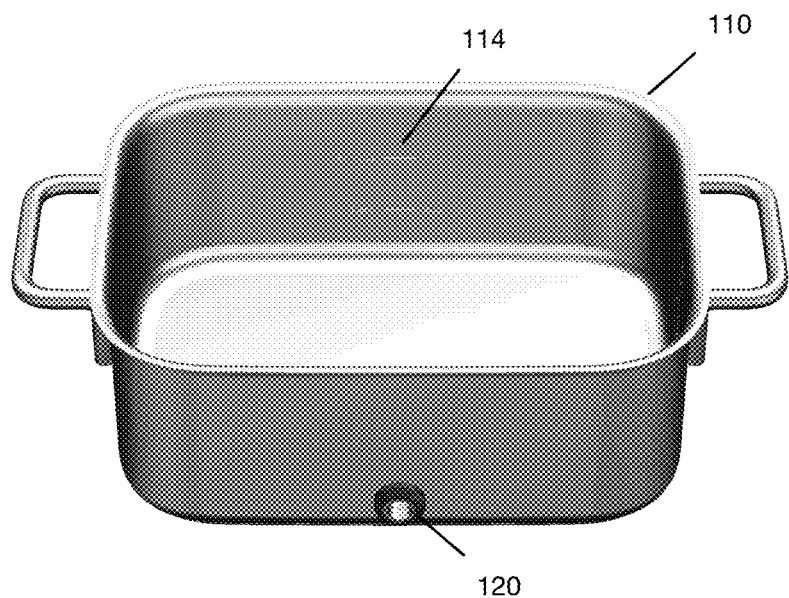
FIG. 16 is an illustrative example of a vessel.
Figure 17:
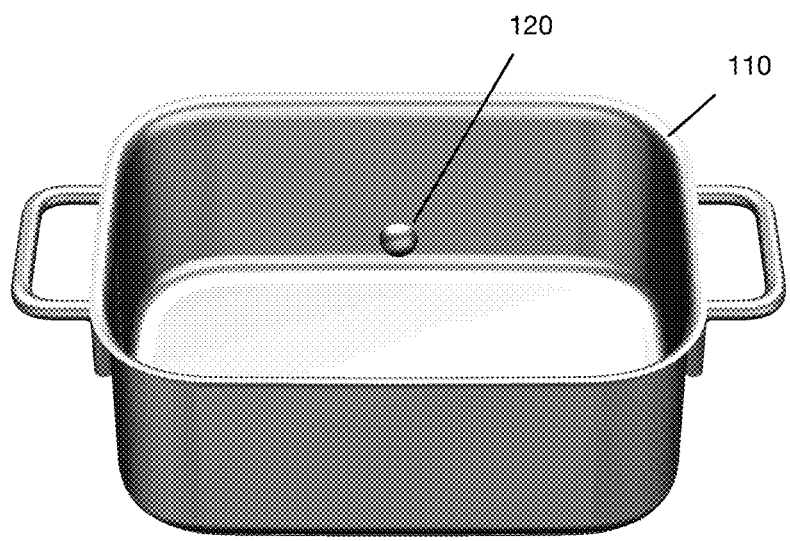
FIGS. 17 and 18 are isometric views of illustrative vessel examples, from a back and left side, respectively.
Figure 18:
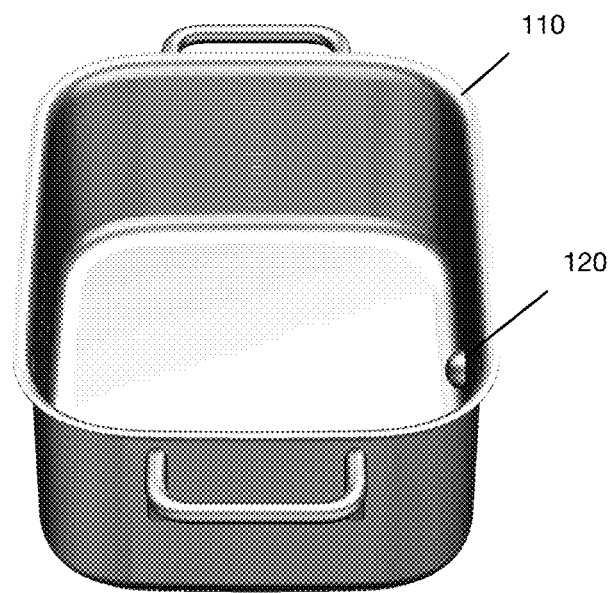

The temperature probe preferably includes a strain relief mechanism 138 which functions to reduce the strain on the wire/cable 135 of the temperature probe resulting from the motion of the plunger. In a first variant, the strain relief mechanism includes a crimping tube which retains an excess length of the wire/cable inside the housing. The excess length of wire can be taken as the difference between the minimum wire length required to span between the strain relief mechanism and the (rear) end of the plunger (e.g., respecting a minimum bend radius and the inner topology of the housing) and the actual wire length spanning said segment. The excess length of wire retained inside the housing can create a coil or "U" shape (an example is shown in FIGS. 14A and 14B) which isolates motion of the cable inside of the housing and/or a sleeve 142 of the probe engagement mechanism, where strain or kinking can be reduced or controlled. The housing interior can be smooth, such that there are no sharp edges to potentially snag or cut the wire/cable, but can additionally or alternatively include retention features. The excess length of wire retained within the probe engagement mechanism can be greater than the max travel and/or elastic deformation distance of the plunger (e.g., plunger spring), greater than the travel distance of the plunger when inserted, greater than the travel distance of the plunger required to engage to the retention mechanism (e.g., lock in place), greater than the axial length of the housing, and/or any appropriate length relative to any other suitable component. The length of wire retained within the probe engagement mechanism can be: <4 mm, 4 mm, 6 mm, 8 mm, 10 mm, 15 mm, 20 mm, 25 mm, 30 mm, 35 mm, 40 mm, 50 mm, >50 mm, a range bounded by any of the aforementioned values, and/or any other suitable length. The crimping tube is preferably stainless steel, but can alternatively be any other appropriate metal, metal alloy, plastic, and/or other suitable material. In a first example, the crimping tube extends radially through the housing thickness, and can additionally or alternatively extend radially through a guide thickness. In a second example, the crimping tube extends axially through the backing. In a third example, the crimping tube can be skewed at any suitable angle (e.g., 45 degrees, 90 degrees) relative to the housing. In a second variant, the strain relief includes a slip ring, cable carrier (drag chain), cable ties, cable clamps, and/or other suitable strain relief mechanism.

However, the strain relief can include any other suitable components.

The housing of the temperature probe can optionally include a guide which functions to retain the wire/cable 135 relative to the housing. The guide can additionally or alternatively function to retain one end of the plunger spring. The guide can additionally or alternatively function to orient one or more components during assembly of the probe engagement mechanism. The guide can be any suitable geometry: cylindrical, conic, rectangular, and/or any other appropriate geometry. Preferably, the guide defines an interior cavity which houses the excess length of the wire/cable, but can additionally or alternatively be flanged, grooved, tapered, and/or otherwise configured to retain its position relative to the housing. The guide is preferably inserted into the housing after the plunger and the plunger spring, retaining the plunger and the plunger spring, but can be otherwise assembled. The guide can be retained proximate the second end of the housing by the backing, fastened to the housing, pressed/snapped into the housing, welded to the housing, and/or otherwise mechanically fixed or oriented relative to the housing.

The housing can optionally include a grip 144 which functions to insulate the temperature probe. The grip can additionally function to protect the temperature probe from mechanical impacts and stresses. The grip can additionally function to retain a strain relief component (e.g., crimping tube) or other component relative to the housing. The grip is preferably silicone rubber, but can be any suitable polymer, insulating material, and/or other material. The grip is preferably formed/molded around the probe engagement mechanism (e.g., as an overmold), but can additionally or alternatively be injection molded, cast, additively manufactured, vacuum cast, and/or otherwise manufactured. The grip can be fabricated as a single component or multiple sub-components, which can be assembled around, bonded to, and/or otherwise encasing the housing or other components of the probe engagement mechanism. The grip can have any suitable geometry, which can be: shaped like a handle/knob, rounded, rectangular, tapered/un-tapered, uniform thickness, variable thickness, and/or have any other appropriate geometry.

Figure 4:
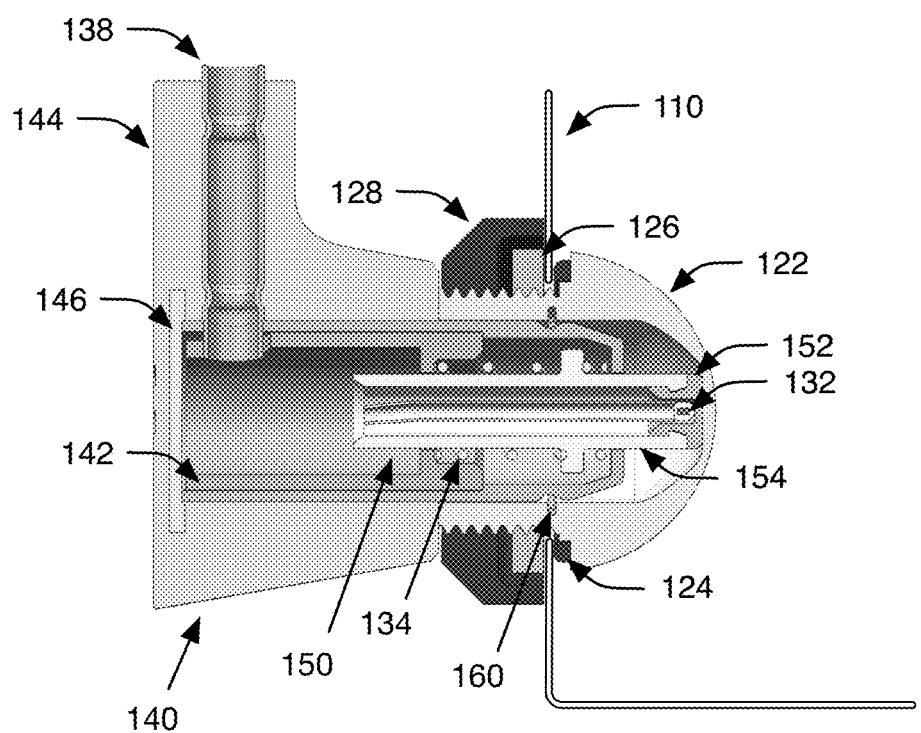
FIG. 4 is a cross sectional view of an example of the engagement mechanism and the probe port.
Figure 5:
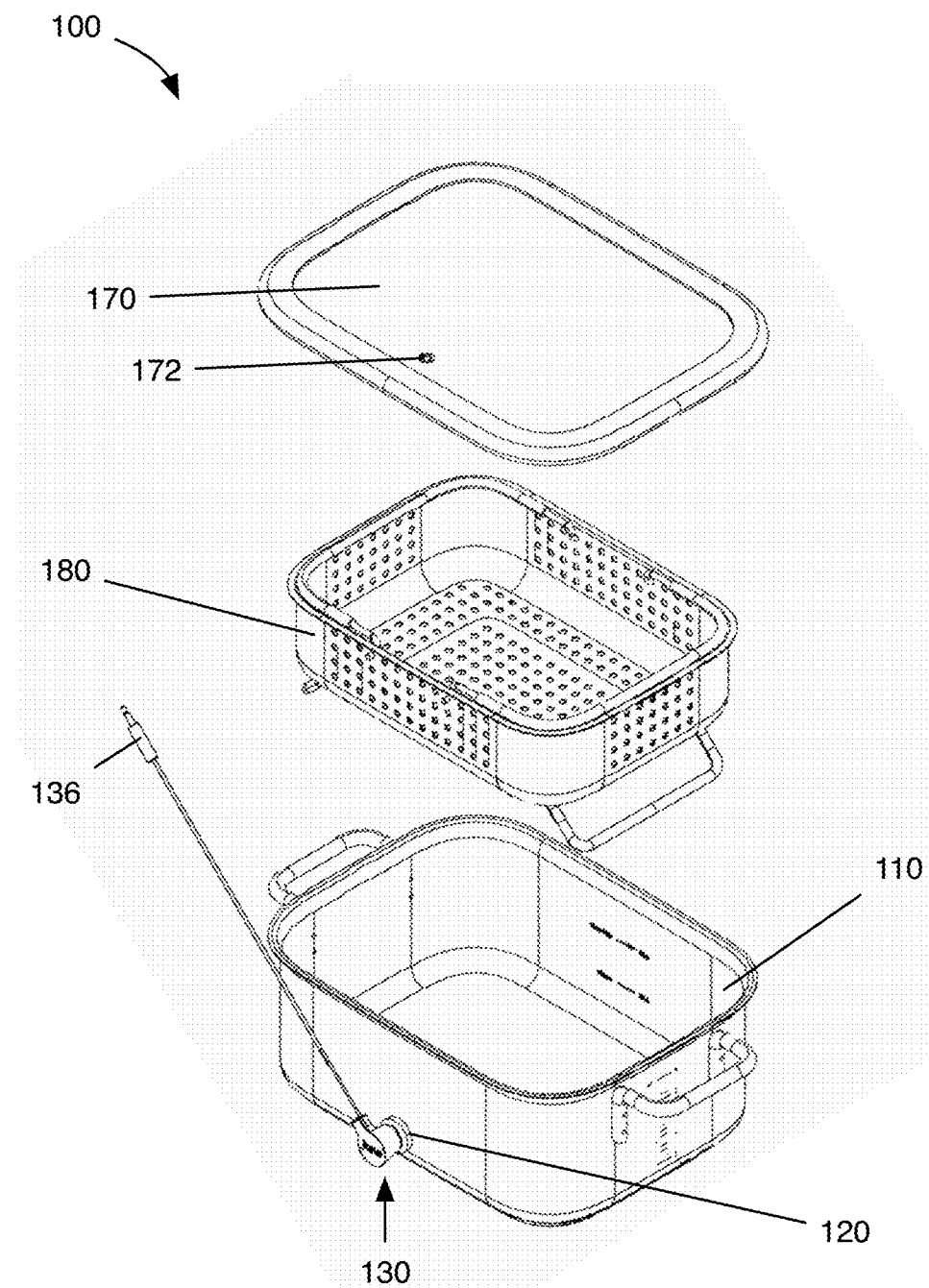
FIG. 5 is an exploded view of a variant of the system.
Figure 6A:
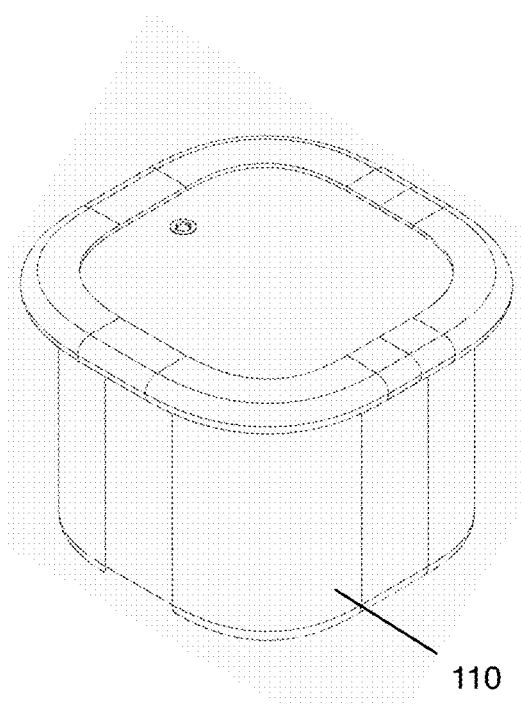
FIG. 6A is an isometric view of a variant of the vessel.
Figure 6B:
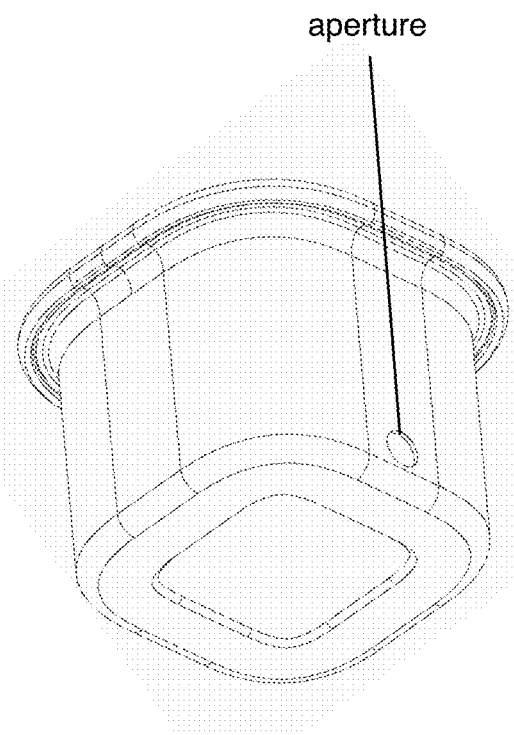
FIG. 6B is an isometric view of a variant of the vessel.

The temperature probe can include a probe engagement mechanism (an example is shown in FIG. 4) which functions to mechanically retain the temperature probe position relative to the vessel. The probe engagement mechanism can optionally function to insulate the temperature probe and/or probe interface from the interior air volume of the cooking appliance. The probe engagement mechanism can have any suitable geometry which can interface with the cap and/or retention mechanism of the vessel. Preferably, the probe engagement mechanism is rotationally symmetric, such as: circular (in any orientation), symmetric in a specific number of orientations (e.g., 2, 3, 4, more than 4), star-shaped, square, triangular, hexagonal, prismatic, etc.), axially symmetric (e.g., lateral, vertical), asymmetric (e.g., keyed), but can alternatively have any appropriate geometry.

Preferably, the probe engagement mechanism engages through the aperture of the vessel wall at the probe interface (e.g., via the cap and/or retention mechanism). In a first variant, the probe engagement mechanism includes a clip including a sprung member extending across a chord of the probe (tip) insertion aperture, which engages a collar in the probe. The probe engagement mechanism can include one, two, three, or more than three sprung members extending across a single chord, opposing chords, multiple chords cooperatively forming a closed polygon (triangle, rectangle, hexagon, octagon, etc.), and/or other set of chords of the insertion aperture. The sprung members can include: metal strips, a spring-loaded member biased radially inward, or be otherwise configured. In a second variant, the probe engagement mechanism includes a bayonet mount or a screw mechanism. However, the probe engagement mechanism can be otherwise configured, and engage the vessel in any appropriate manner.

However, the probe engagement mechanism can include any other suitable components/elements.

In a specific example: the accessory includes a probe interface including a cap and a nut with a seal compressed (e.g., by tightening the nut) between the cap and the side of the vessel. The seal engages an inset portion of the cap so it does not sit proud of the cap-thereby mitigating the risk of accidental damage from knives or other sharp objects. The seal further insulates the cap from the walls of the vessel. In variants of the system, there is no specific orientation of the probe engagement mechanism required to fit (e.g., snap-in) into the probe interface—this can be achieved by utilizing a rotationally symmetric geometry (of the probe engagement mechanism) which is tapered toward the end to be self-aligning. In a specific example, the probe engagement mechanism and/or the probe interface are conic, and thereby engaging in any orientation. In variants, the engagement mechanism includes a plunger capable of depressing further than the distance required to establish thermal contact with the working fluid and/or locked into place-which ensures that the connector cannot be inserted and lock in a position with an air-gap between the temperature probe and the working fluid.

However, the system can include any other suitable components.

4. Method

Figure 2:
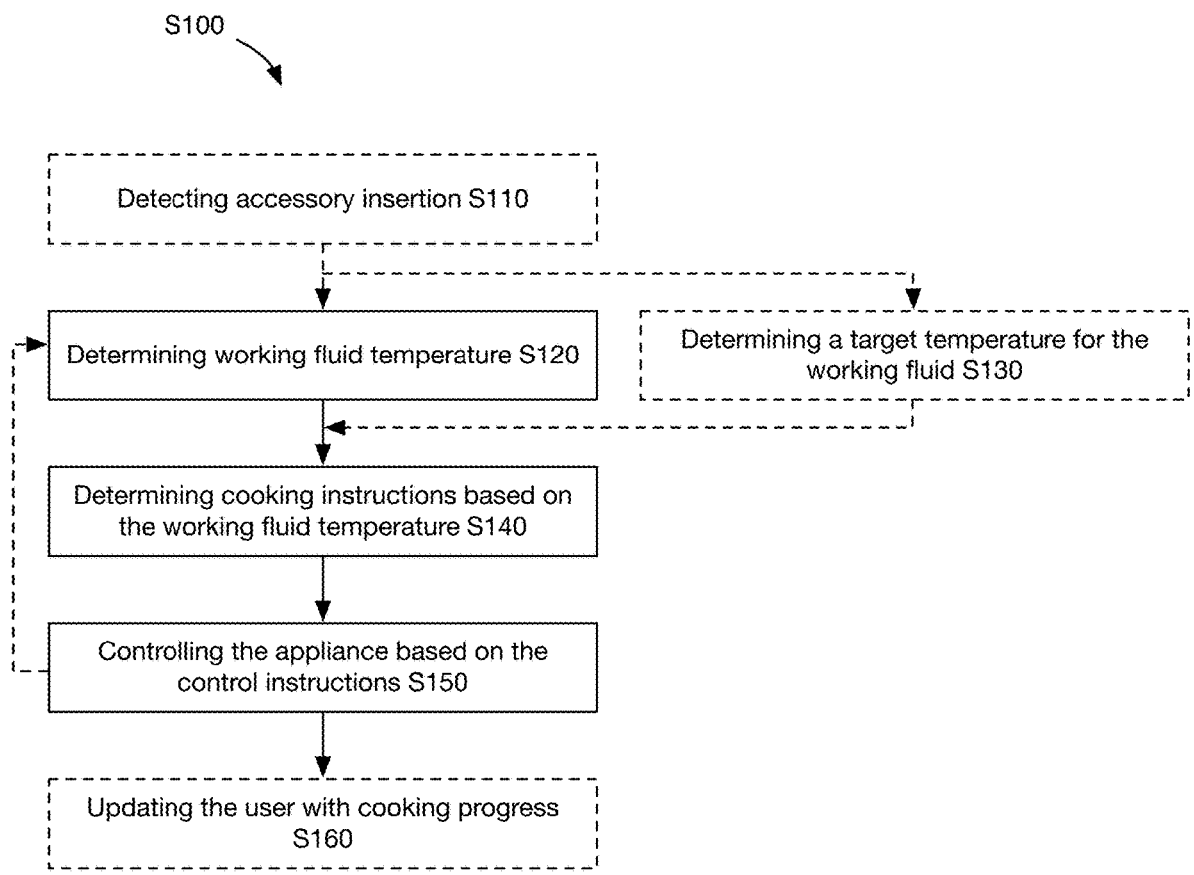
FIG. 2 is a diagrammatic representation of the method of use for a variation of the cooking appliance accessory.
Figure 11:
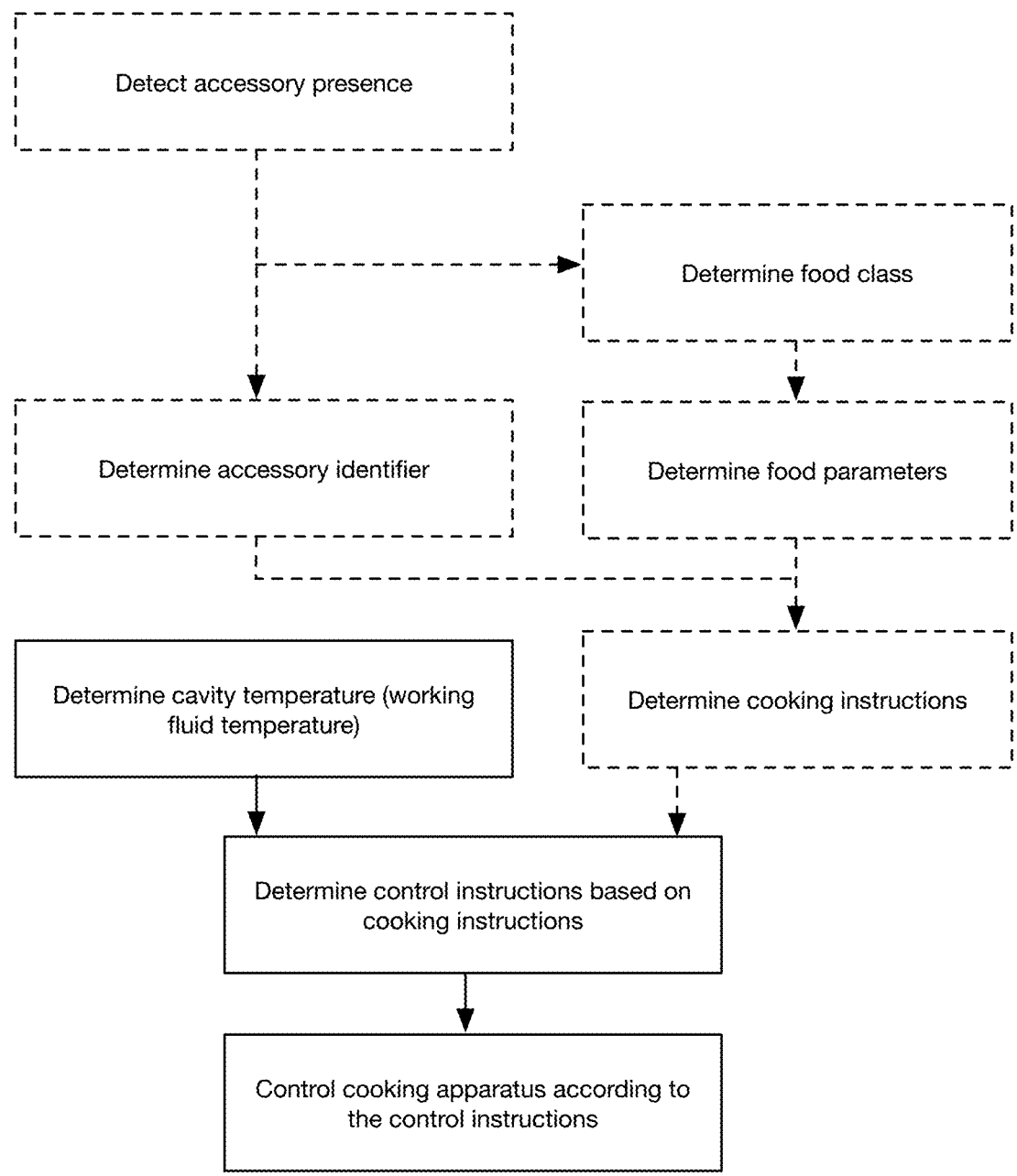
FIG. 11 is a diagrammatic representation of an example of the method.

The method S100, as shown in FIG. 2, includes: determining working fluid temperature S120, determining cooking instructions based on the working fluid temperature S140, and controlling the oven based on the control instructions S150. The method S100 can optionally include: detecting accessory insertion S110, determining a target temperature for the working fluid S130 (an example is shown in FIG. 11), and updating the user of cooking progress S160. However, the method can include any other suitable elements.

Detecting accessory insertion S110 functions to detect the presence of the accessory and/or temperature probe associated with the accessory in the cooking appliance. In a first variant, S110 can be performed by an optical sensor (e.g., camera of the cooking appliance) which can detect the presence of the vessel and/or detect a specific optical pattern (e.g., on the exterior of the vessel, on the lid of the vessel, image recognition for the geometry of the vessel). In a second variant, S110 can be performed by a pressure sensor, which detects the weight of the vessel inside the cooking appliance. In a third variant, S110 includes receiving a user input (e.g., on a touchscreen, button, connected mobile device, etc.) indicating the insertion of the vessel and/or temperature probe inside the cooking appliance. In a fourth variant, S110 can include receiving an electrical signal from the temperature probe at the cooking appliance and/or a sensor determining the connection of the temperature probe to the cooking appliance (e.g., via a wired or wireless connection). In a fifth variant, S110 detects insertion of the device by near field communication, a specific optical pattern, or other recognition technique. S110 can determine the specific device (e.g., temperature probe, accessory), via an IMEI or other device identifier, the type of device (e.g., temperature probe, glass thermistor, etc.), and/or determine any other suitable device information. Alternatively, S110 can detect that any device is connected.

However, device insertion can be otherwise detected.

The method can optionally include identifying the food, which functions to determine the cooking instructions for cooking appliance execution. In a first variation, the food is identified based on an image sampled by an optical sensor (e.g., camera of a cooking appliance), using a neural network trained to identify one or more food classes from one or more images. The image preferably includes a clear view of the food within the cooking accessory (e.g., through the cooking accessory's transparent lid), but can alternatively include a partially or entirely obfuscated view. In a specific example, the temperature measurement from the temperature probe can be used to determine whether to use the automatically-determined food identifier (e.g., wherein temperature measurements above a threshold temperature can be associated with steam obfuscation of the food). In a second variation, the food is manually identified by a user (e.g., at the cooking appliance interface, at a user device interface, etc.). In a third variation, the food identity is estimated (e.g., from contextual parameters; retrieved from an auxiliary appliance previously cooking the food; from a cooking schedule; etc.). However, the food identity can be otherwise determined.

The method can optionally include determining working fluid parameters, which functions to determine or adjust the cooking instructions. Examples of working fluid parameters include: level within the vessel, type (e.g., water, chicken broth, beef broth, etc.), color, temperature, and/or any other suitable parameter. The working fluid parameters can be automatically or manually determined. The working fluid parameters can be determined from: an image (e.g., sampled by the optical sensor; using a trained neural network, etc.), the temperature probe, a user, relationship with the food (e.g., above, below, etc.), or otherwise determined.

The method can optionally determine the parameters of the food being cooked, which can be used to select or modify the cooking instructions, selectively control cooking elements (e.g., heating elements, convection elements, etc.), or otherwise used. Food parameters can include: food class, food subclass, count, distribution, color, temperature, barrier presence (e.g., food bagging or packaging), or any other suitable food parameter. Food parameters can be determined using the optical sensor (e.g., determined by a neural network based on an image sampled by the optical sensor), a secondary temperature probe, be received from the user, or otherwise determined. In one example, the food parameters can be determined as described in U.S. application Ser. No. 15/147,597 filed 5 May 2016, incorporated herein in its entirety by this reference, but can be otherwise determined.

Determining working fluid temperature S120 functions to monitor the temperature of the working fluid. In variants, S120 can enable closed loop temperature control for the working fluid. S120 can occur with any appropriate sampling frequency—the sampling frequency can be: <0.1 Hz, 0.1 Hz, 0.1 to 1 Hz, 1 Hz, 1 to 10 Hz, 10 Hz, 10 to 100 Hz, 100 Hz and/or any other appropriate sampling frequency. The temperature of the working fluid is preferably measured at the temperature probe and received via wired/wireless signal at the cooking appliance or other suitable endpoint.

However, the working fluid temperature can be otherwise determined.

Determining cooking instructions functions to determine food parameter targets, working fluid targets (e.g., temperature minima, maxima, thresholds, etc.), cooking appliance element instructions, setpoints, and/or any other suitable set of instructions or targets for the cooking session, wherein the cooking appliance can be controlled based on the cooking instructions. The cooking instructions can be calculated, looked up, retrieved, manually specified, learned (e.g., from operation histories), or otherwise determined. The cooking instructions can be determined based on: the accessory identifier (e.g., accessory class or type), accessory state (e.g., working fluid volume, lid state), cooking appliance state (e.g., internal temperature), food identifier, food parameter values, context (e.g., time of day), user preference for the food class, and/or any other suitable information. For example, the system can determine that chicken in a sous vide pot with a closed lid is arranged within the oven, and automatically select or present sous vide chicken cooking instructions (e.g., set the target internal temperature to 66 deg C.). In a second example, the method can select a first cooking instruction for chicken in a steaming basket; select a second, different cooking instruction (e.g., sous vide) for chicken immersed in working fluid with a bag; select a third, different cooking instruction (e.g., soup) for chicken pieces immersed in working fluid; and/or select a fourth, different cooking instruction for chicken on a baking tray.

Determining cooking instructions can include determining a target temperature for the working fluid S130, which functions to establish a target (e.g., setpoint) for temperature of the working fluid. In variants, the target temperature of the working fluid can enable closed-loop temperature control for the working fluid. The target temperature can be: a user input or user selection (e.g., on a touchscreen interface, on a mobile device, on a dial/knob of the appliance, on a button of the appliance, etc.), a set of pre-programmed cooking instructions (e.g., for a particular cooking process, for a particular type of food), automatically determined based on food recognition (e.g., using a camera), a learned target, determined based on historical data from the specific cooking appliance and/or similar devices, and/or otherwise determined. The temperature target can be a specific value, a timeseries, a range of values, and/or other data type. S130 can be performed by a processor of the cooking appliance, by a mobile user device, on a cloud server, at a remote endpoint, and/or at another endpoint.

However, the target temperature can be otherwise determined.

Determining cooking instructions can include determining control instructions for appliance elements based on the working fluid temperature and a target temperature S140 functions to determine control instructions for heating elements and/or convection elements of the cooking appliance. Control instructions can be determined by the same approach for different cooking modes or the same global approach. Preferably, control instructions employ closed loop controls such as: PID control, linear control, non-linear control, model predictive control (MPC), linear-quadratic-Gaussian control (LQG), however the control instructions can be open loop, manually determined (e.g., user specifies convection element is ON/OFF), and/or other any appropriate controls. Control instructions can be executed with any appropriate control frequency, which can be the same as the temperature sampling frequency, at a lower frequency than the temperature sampling frequency, at a higher frequency than the temperature sampling frequency, <0.1 Hz, 0.1 Hz, 0.1 to 1 Hz, 1 Hz, 1 to 10 Hz, 10 Hz, 10 to 100 Hz, 100 Hz and/or with any other appropriate control frequency.

In a first (e.g., pre-heat) mode, S140 preferably operates heating elements at maximum power output and/or at a maximum continuous power output (e.g., below max power output, 90% power, 80% power, 70% power, etc.) until the working fluid temperature reaches the target temperature.

In a second (e.g., steaming) mode, S140 preferably operates the heating elements at a constant/predetermined power level (e.g., sufficient to maintain a boil, sufficient to maintain the working fluid temperature within a predetermined range of 100° C.). The convection elements can be on (e.g., with any appropriate power level) or off during the second mode.

In a third (e.g., sous vide) mode, S140 preferably holds the temperature at a target temperature, cycling the heating elements (e.g., ON/OFF, between LOW/HIGH power, etc.) in order to maintain the target temperature.

In a fourth mode, S140 shuts off the heating elements to lower the temperature of the working fluid, and can optionally activate convection elements (e.g., fans) inside the cooking appliance.

In a fifth mode, S140 control instructions direct the appliance between a combination or permutation of the other modes. In a specific example, the first mode raises the temperature of the working fluid to a target temperature, then the second mode holds the working fluid at a boil, then the fourth mode lowers the temperature of the working fluid, then the third mode holds the working fluid at a "warm" temperature.

However, the control instructions can include a simmer mode (e.g., wherein the heating elements are controlled to substantially maintain the working fluid temperature higher than 71-82° C. but lower than 100° C.); a poaching mode (e.g., wherein the heating elements are controlled to substantially maintain the working fluid temperature at 71-82° C.); and/or any other suitable cooking mode.

The control instructions can be dynamically determined or adjusted based on the accessory or temperature probe parameters. In one example, the heating elements can be controlled based on the location (and/or identity) of the accessory or temperature probe within the cavity. In a specific example, the left heating elements can be turned on (and the remainder kept off) when the accessory is in the left portion of the cooking cavity. In a second specific example, the heating elements proximal the temperature probe (e.g., as determined based on temperature probe measurements, images including the temperature probe within the cavity, etc.) can be turned off or lowered to prevent temperature probe damage.

However, control instructions can operate in any other suitable modes and/or control instructions can be otherwise determined.

Controlling the cooking appliance according to the cooking instructions S150 functions to implement control instructions for various heating elements, convection elements, and/or other cooking appliance elements. The frequency of S150 is preferably dependent on the control instructions (e.g., the same frequency, dictated by the control instructions), but can be independent of the control instructions. S150 can be executed once (e.g., upon initial insertion of the vessel, in response to S110), in response to S140, executed periodically, executed N times during the cook program, and/or with any other suitable frequency.

S150 can directly or indirectly control/change the power, voltage, current, supplied to heating elements, and/or otherwise control the thermal output of the heating elements (e.g., between HIGH/MEDIUM/LOW settings). Heating elements are preferably carbon fiber heating elements, but can alternatively be any resistive, inductive, or other heating element/heat source (e.g., gas powered heat source). Heating elements can be controlled individually, collectively, and/or a subset can be controlled therein, such as controlling heating elements on: broad interior face(s) of oven, narrow interior face(s) of oven, bottom interior face of oven, top interior face of oven, any combination thereof, and/or any other suitable subset of heating elements.

S150 can directly or indirectly control/change the fan speed, air movement rate (e.g., CFM, mass of air moved, etc.), and/or other parameters of one or more convection elements of the oven.

In a first variant, the working fluid temperature is less than the target temperature, S150 can rapidly heat (e.g., max power output) until the target temperature is reached, and then shutoff or adjust heating element operation to maintain the target temperature. Alternatively, the system can rapidly heat until a predetermined temperature below the target temperature is reached (e.g., determined based on the target temperature, x degrees below the target temperature, x % of the target temperature, etc.) to prevent overshoot during rapid heating.

In a second variant, the working fluid temperature is approximately the same as the target temperature (e.g., measured to be the same, measured within a threshold range of the target temperature, etc.), and S150 controls the heating elements to reach the same temperature as the appliance cavity (e.g., determined based on the target temperature and/or an offset from the target temperature) and/or controls the heating elements to maintain the working fluid temperature at the target temperature (e.g., within a predetermined error margin).

In variants, maintaining the target temperature can include shutting off the convection elements (e.g., fans) to maintain a gaseous blanked around the vessel. When maintaining the target temperature, the temperature of the working fluid can be periodically sampled and/or ignored while maintaining the cavity temperature or a predetermined power output (e.g., calculated based on anticipated heating cavity thermal loss, calculated based on the target temperature, etc.).

However, the cooking appliance can be otherwise controlled.

Optionally updating the user of cooking progress S160 functions to provide feedback to the user. S160 can include providing feedback via: a visual display, LED (or other light source), update/notification on portable device (e.g., via Bluetooth, Wi-Fi, etc.), audio signal, and/or other communication. S160 can communicate to the user, the estimated completion time, notify the user upon completion of cooking, communicate instructions to the user (such as: insert the fluid vessel, cover the fluid vessel, add working fluid to the fluid vessel, remove the fluid vessel, etc.), communicate the temperature of the cooking appliance, communicate the temperature of the working fluid, communicate the estimated internal temperature of the food, communicate a temperature probe coupling error, and/or otherwise update the user.

In a specific variant, the system can detect unusually high readouts from the temperature probe associated with a bad thermal connection and notify the user so that they can address the issue. In an example, the system can detect a temperature probe error if the rate of measured temperature increase is greater than the expected rate based on the appliance operation and/or rate of the appliance cavity temperature increase.

However, the user can be otherwise updated.

Embodiments of the system and/or method can include every combination and permutation of the various system components and the various method processes, wherein one or more instances of the method and/or processes described herein can be performed asynchronously (e.g., sequentially), concurrently (e.g., in parallel), or in any other suitable order by and/or using one or more instances of the systems, elements, and/or entities described herein.

As a person skilled in the art will recognize from the previous detailed description and from the figures and claims, modifications and changes can be made to the preferred embodiments of the invention without departing from the scope of this invention defined in the following claims.

We claim:

1. A cooking accessory, comprising:
    a fluid vessel configured to contain a working fluid, the fluid vessel comprising:
        a probe port extending through a bottom of a sidewall of the fluid vessel, the probe port comprising a convex cap defining a cavity; and
        thermal insulation comprising a fluid seal, the fluid seal arranged between the probe port and the sidewall;
    a temperature probe removably couplable to the probe port, comprising:
        a temperature sensor;
        a housing;
        a spring-loaded plunger comprising a body and a tip, wherein the temperature sensor is mechanically bonded to and thermally connected with the tip, wherein a first spring of the spring-loaded plunger is configured to compress the tip against the cap at a base of the cavity; and
        a grip encapsulating an end of the housing opposing the spring-loaded plunger; and
    a second spring retaining the housing relative to the cavity of the probe port,
    wherein the thermal insulation and the grip cooperatively insulate the housing, the spring-loaded plunger, and the cap from a fluidic exterior of the cooking accessory, wherein the insulation layer and the grip each have a thermal conductivity less than one tenth that of the cap.

2. The cooking accessory of claim 1, wherein the second spring comprises a retaining ring arranged within a first circumferential groove of the cavity, wherein the retaining ring engages a second circumferential groove of the housing.

3. The cooking accessory of claim 1, wherein the fluid vessel has a radiused edge between the base and the sidewall, wherein the probe port is located above the radiused edge.

4. The cooling accessory of claim 1, wherein the temperature probe further comprises: an electrical connector; a wire electrically connecting the temperature sensor to the electrical connector; and a strain relief mechanism securing a portion of the wire to the housing, wherein the secured portion of wire defines an excess wire length within the housing which exceeds a maximum travel of the spring-loaded plunger.

5. The cooking accessory of claim 4, wherein the electrical connector is configured to connect to an appliance port within a cooking cavity of an appliance.

6. The cooking accessory of claim 5, wherein the appliance is controllable based on a temperature of the working fluid, as measured by the temperature probe.

* * * * *